(12) United States Patent
Setty et al.

(10) Patent No.: US 11,010,493 B2
(45) Date of Patent: May 18, 2021

(54) MULTIPLE MESSAGE RETRIEVAL FOR SECURE ELECTRONIC COMMUNICATION

(71) Applicant: Microsoft Technology Licensing, LLC, Redmond, WA (US)

(72) Inventors: Srinath Tumkur Venkatacha Setty, Redmond, WA (US); Sebastian G. Angel, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 16/512,098

(22) Filed: Jul. 15, 2019

(65) Prior Publication Data
US 2019/0340391 A1    Nov. 7, 2019

Related U.S. Application Data

(62) Division of application No. 15/295,608, filed on Oct. 17, 2016, now Pat. No. 10,395,060.

(51) Int. Cl.
| | |
|---|---|
| *G06F 21/00* | (2013.01) |
| *G06F 21/62* | (2013.01) |
| *H04L 12/58* | (2006.01) |
| *G06Q 10/10* | (2012.01) |
| *H04L 29/06* | (2006.01) |

(52) U.S. Cl.
CPC ...... *G06F 21/6263* (2013.01); *G06F 21/6227* (2013.01); *G06Q 10/10* (2013.01); *G06Q 10/107* (2013.01); *H04L 51/22* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 9,846,596 B1* | 12/2017 | Nogin | G06F 9/5027 |
| 2008/0109448 A1* | 5/2008 | Aboel-Nil | G06Q 10/107 |

FOREIGN PATENT DOCUMENTS

| | | | | |
|---|---|---|---|---|
| EP | 2365669 A1 * | 9/2011 | | H04L 51/03 |

OTHER PUBLICATIONS

Reiter, et al., "Crowds: Anonymity for Web Transactions", In Proceedings of ACM Transactions on Information and System Security, vol. 1, Issue 1, Nov. 1, 1998, pp. 66-92.

(Continued)

*Primary Examiner* — Andrew J Steinle

(57) ABSTRACT

Techniques for multiple message retrieval for secure electronic communication are described. The techniques, for instance, utilize a server and computing devices employing a private information retrieval scheme to allow a receiving device to locate multiple electronic communications on a server, request delivery of the multiple electronic communications without the server being aware of which electronic communication are requested, and receive the electronic communications without the server being aware of which electronic communications were sent. For example, the server may utilize an efficient electronic communication storage structure for storing and retrieving multiple electronic communications.

20 Claims, 10 Drawing Sheets

(56) References Cited

OTHER PUBLICATIONS

Rennhard, et al., "Introducing MorphMix: Peer-to-Peer based Anonymous Internet usage with Collusion Detection", In Proceedings of the ACM workshop on Privacy in the Electronic Society, Nov. 21, 2002, pp. 91-102.

Rogaway, Phillip, "The Moral Character of Cryptographic Work", In Proceedings of IACR Cryptology ePrint Archive, Dec. 2, 2015, 48 Pages.

Rusbridger, Alan, "The Snowden Leaks and the Public", Retrieved from: https://www.nybooks.com/articles/2013/11/21/snowden-leaks-and-public/, Nov. 21, 2013, 2 Pages.

Rushe, Dominic, "Yahoo $250,000 daily fine over NSA data refusal was set to double 'every week'", Retrieved from: https://www.theguardian.com/world/2014/sep/11/yahoo-nsa-lawsuit-documents-fine-user-data-refusal, Sep. 12, 2014, 3 Pages.

Sassaman, et al., "The Pynchon Gate: A Secure Method of Pseudonymous Mail Retrieval", In Proceedings of the ACM Workshop on Privacy in the Electronic Society (WPES),, Nov. 7, 2005, 9 Pages.

Schneier, Bruce, "Data and Goliath: The Hidden Battles to Collect Your Data and Control Your World", In Report of WW Norton & Company, Mar. 2, 2015, 295 Pages.

Sherwood, et al., "P5: A Protocol for Scalable Anonymous Communication", In Journal of Computer Security, vol. 13, Issue 6, Jan. 1, 2005, 13 Pages.

Shmatikov, et al., "Measuring Relationship Anonymity in Mix Networks", In Proceedings of the 5th ACM workshop on Privacy in electronic society, Oct. 30, 2006, 4 Pages.

Shmatikov, et al., "Timing Analysis in Low-Latency Mix Networks: Attacks and Defenses", In Proceedings of the European Symposium on Research in Computer Security (ESORICS), Sep. 18, 2006, 16 Pages.

Singh, et al., "Eclipse Attacks on Overlay Networks: Threats and Defenses", In Proceedings of the IEEE International Conference on Computer Communications (INFOCOM), Apr. 10, 2006, 12 Pages.

Sirer, et al., "Eluding Carnivores: File Sharing with Strong Anonymity", In Proceedings of the ACM SIGOPS European Workshop, Sep. 19, 2004, 6 Pages.

Van Den Hooff, et al., "Vuvuzela: Scalable Private Messaging Resistant to Traffic Analysis", In Proceedings of the 25th Symposium on Operating Systems Principles, Oct. 4, 2015, pp. 137-152.

Waidner, et al., "The Dining Cryptographers in the Disco: Unconditional Sender and Recipient Untraceability with Computationally Secure Serviceability", In Proceedings of the workshop on the theory and application of cryptographic techniques on Advances in cryptology, Apr. 10, 1989, 23 Pages.

Wang, et al., "Improved Website Fingerprinting on Tor", In Proceedings of the 12th ACM workshop on Workshop on privacy in the electronic society, Nov. 4, 2013, pp. 201-212.

Warren, et al., "The Right to Privacy", In Journal of Harvard Law Review, vol. 4, Issue 5, Dec. 15, 1890, pp. 193-220.

Wikstrom, Douglas, "Five Practical Attacks for Optimistic Mixing for Exit-Polls", In Proceedings of the Conference on Selected Areas in Cryptography (SAC),, Aug. 14, 2003, pp. 160-174.

Wolinsky, et al., "Dissent in Numbers: Making Strong Anonymity Scale", In Proceedings of the 10th USENIX Symposium on Operating Systems Design and Implementation (OSDI), Oct. 2012, pp. 179-182.

Zantout, et al., "I2P Data Communication System", In Proceedings of the International Conference on Networks, Jan. 2011, pp. 401-409.

Angel, et al., "Unobservable communication over fully untrusted infrastructure", In Proceedings of 12th USENIX Symposium on Operating Systems Design and Implementation, Nov. 2, 2016, pp. 551-569.

Egger, et al., "Practical Attacks Against the i2p Network", In Proceedings of International Workshop on Recent Advances in Intrusion Detection, Oct. 23, 2013, pp. 432-451.

Freedman, et al., "Tarzan: A Peer-to-Peer Anonymizing Network Layer", In Proceedings of the 9th ACM Conference on Computer and Communications Security, Nov. 18, 2002, pp. 193-206.

Gardiner, et al., "Blindspot: Indistinguishable Anonymous Communications", In Repository of arXiv:1408.0784, Aug. 4, 2014, 13 Pages.

Gasarch, et al., "Computationally Inexpensive cPIR", Retrieved from: https://www2.seas.gwu.edu/~arkady/papers/pirlattice.pdf, 2006, 15 Pages.

Gelernter, et al., "On the Limits of Provable Anonymity", In Proceedings of the ACM Workshop on Privacy in the Electronic Society (WPES), Nov. 4, 2013, 16 Pages.

Goldberg, Ian, "Improving the Robustness of Private Information Retrieval", In Proceedings of IEEE Symposium on Security and Privacy, May 20, 2007, 15 Pages.

Golle, et al., "Dining Cryptographers Revisited", In Proceedings of the International Conference on the Theory and Applications of Cryptographic Techniques (EUROCRYPT), May 2, 2004, pp. 456-473.

Greenberg, Andy, "Whatsapp just Switched on end-to-end Encryption for Hundreds of Millions of Users", Retrieved from: https://www.wired.com/2014/11/whatsapp-encrypted-messaging/, Nov. 18, 2014, 3 Pages.

Greenwald, et al., "New Zealand Launched Mass Surveillance Project while Publicly Denying it.", In The Intercept, Sep. 15, 2014, 10 Pages.

Greenwald, et al., "NSA Prism Program taps in to user Data of Apple, Google and Others", In Journal of the Guardian 7, No. 6, Jun. 6, 2013, 6 Pages.

Groth, et al., "Multi-Query Computationally-Private Information Retrieval with Constant Communication Rate.", In Proceedings of the International Conference on Practice and Theory inPublic Key Cryptography (PKC),, May 26, 2010, 17 Pages.

Gulcu, et al., "Mixing E-mail with Babel", In Proceedings of Internet Society Symposium on Network and Distributed Systems Security, Feb. 22, 1996, 15 Pages.

Gupta, et al., "Scalable and Private Media Consumption with Popcorn", In Proceedings of 13th USENIX Symposium on Networked Systems Design and Implementation, Mar. 16, 2016, pp. 91-107.

Hevia, et al., "An Indistinguishability-Based Characterization of Anonymous Channels", In Proceedings of the Privacy Enhancing Technologies Symposium (PETS), Jul. 20, 2008, 27 Pages.

Hopper, et al., "How much Anonymity does Network Latency Leak?", In Proceedings of the ACM Conference on Computer and Communications Security (CCS), Oct. 29, 2007, 10 Pages.

Ishai, et al., "Batch Codes and their Applications", In Proceedings of the 36th Annual ACM Symposium on Theory of Computing, Jun. 13, 2004, pp. 262-271.

Kesdogan, et al., "Fundamental Limits on the Anonymity provided by the MIX Technique", In Proceedings of the IEEE Symposium on Security and Privacy, May 21, 2006, 14 Pages.

Kesdogan, et al., "Stop-And-Go-MIXes providing Probabilistic Anonymity in an Open System", In Proceedings of the International Workshop on Information Hiding, Apr. 14, 1998, 16 Pages.

Kiayias, et al. "Optimal Rate Private Information Retrieval from Homomorphic Encryption", In Proceedings of Privacy Enhancing Technologies Symposium, Jun. 1, 2015, pp. 222-243.

Kissner, et al., "Private keyword-based Push and Pull with Applications to Anonymous Communication", In Proceedings of the International Conference on Applied Cryptography and Network Security (AGNS), Jun. 8, 2004, pp. 16-30.

Krawczyk, Hugo, "Cryptographic Extraction and key Derivation: The HKDF scheme", In Proceedings of the International Cryptology Conference (CRYPTO), Aug. 15, 2010, pp. 631-648.

Kushilevitz, et al., "Replication is not Needed: Single Database, Computationally-Private Information Retrieval", In Proceedings of 38th Annual Symposium on Foundations of Computer Science, Oct. 20, 1997, 10 Pages.

Kwon, et al., "Circuit Fingerprinting Attacks: Passive Deanonymization of Tor Hidden Services", In Proceedings of the USENIX Security Symposium,, Aug. 2015, 16 Pages.

(56) References Cited

OTHER PUBLICATIONS

Kwon, et al., "Riffle: An Efficient Communication System with Strong Anonymity", In Proceedings of Privacy Enhancing Technologies Symposium, Apr. 1, 2016, pp. 115-134.
Le Blond, et al., "Herd: A Scalable, Traffic Analysis Resistant Anonymity Network for VoIP Systems", In Proceedings of the ACM SIGCOMM Conference,, Aug. 17, 2015, 14 Pages.
Le Blond, et al., "Towards efficient Traffic-Analysis Resistant Anonymity Networks", In Proceedings of the ACM SIGCOMM Conference, Aug. 12, 2013, 12 Pages.
Lenzner, Robert, "ATT, Verizon, Sprint are paid Cash by NSA for your Private Communications.", Retrieved from: https://www.forbes.com/sites/robertlenzner/2013/09/23/attverizonsprint-are-paid-cash-by-nsa-for-your-private-commmunications/, Sep. 23, 2013, 2 Pages.
Levine, et al., "Timing attacks in Low-Latency Mix Systems", In Proceedings of the International Financial Cryptography Conference, Feb. 9, 2004, pp. 251-265.
Lueks, et al., "Sublinear Scaling for Multi-Client Private Information Retrieval", In Proceedings of International Financial Cryptography and Data Security Conference, Jan. 26, 2015, 18 Pages.
Mathewsoon, et al., "Practical Traffic Analysis: Extending and Resisting Statistical Disclosure.", In Proceedings of the Workshop on Privacy Enhancing Technologies (PET), May 26, 2004, 18 Pages.
McSherry, Frank, "Timely Dataflow", Retrieved from: https://github.com/TimelyDataflow/timely-dataflow, Aug. 8, 2019, 5 Pages.
Mittal, et al., "Information leaks in Structured peer-to-peer Anonymous Communication Systems", In Journal ACM Transactions on Information and System Security (TISSEC)—Special Issue on Computer and Communications Security, vol. 15, Issue 1, Mar. 1, 2012, 12 Pages.
Mittal, et al., "PIR-Tor: Scalable Anonymous Communication using Private Information Retrieval", In Proceedings of USENIX Security Symposium, Aug. 8, 2011, 16 Pages.
Mittal, et al., "Pisces: Anonymous Communication using Social Networks", In Repository of arXiv:1208.6326, Aug. 30, 2012, 15 Pages.
Mitzenmacher, et al., "Probability and Computing: Randomized Algorithms and Probabilistic Analysis", In Cambridge University Press, Jul. 3, 2017, 366 Pages.
Mitzenmacher, Michael David., "The Power of Two Choices in Randomized Load Balancing", In IEEE Transactions on Parallel and Distributed Systems, vol. 12, Issue 10, Oct. 2001, 127 Pages.
Murray, et al., "Naiad: a Timely Dataflow System", In Proceedings of the Twenty-Fourth ACM Symposium on Operating Systems Principles, Nov. 3, 2013, pp. 439-455.
Nambiar, et al., "Salsa: A Structured Approach to Large-Scale Anonymity", In Proceedings of the ACM Conference on Computer and Communications Security (CCS, Oct. 30, 2006, 10 Pages.
Naor, et al., "Public-key Cryptosystems Provably Secure against Chosen Ciphertext Attacks", In Proceedings of the twenty-second annual ACM symposium on Theory of computing, Apr. 1, 1990, 11 Pages.
Nguyen, et al., "Breaking and Mending Resilient Mix-Nets.", In Proceedings of the Workshop on Privacy Enhancing Technologies (PET), Mar. 26, 2003, 15 Pages.
Pallier, Pascal, "Public-Key Cryptosystems Based on Composite Degree Residuosity Classes", In Proceedings of the International Conference on the Theory and Applications of Cryptographic Technique, May 2, 1999, pp. 223-238.
Panchenko, et al., "Website fingerprinting in Onion Routing based Anonymization Networks.", In Proceedings of the 10th annual ACM workshop on Privacy in the electronic society, Oct. 17, 2011, 11 Pages.
Parkes, et al., "Achieving Trust without Disclosure: Dark Pools and a Role for Secrecy-Preserving Verification", In Proceedings of the Conference on Auctions, Market Mechanisms and Their Applications, Aug. 8, 2015, 11 Pages.
Pfitzmann, et al., "A Terminology for Talking about Privacy by data Minimization: Anonymity, Unlinkability, Undetectability, Unobservability, Pseudonymity, and Identity Management", Retrieved from: http://dud.inf.tu-dresden.de/literatur/Anon_Terminology_v0.34.pdf, Aug. 10, 2010, 98 Pages.
Pfitzmann, Birgit, "Breaking an Efficient Anonymous Channel", In Proceedings of Workshop on the Theory and Applications of Cryptographic Techniques, May 9, 1994, pp. 332-340.
Pfitzmann, et al., "Flow to Break the Direct Rsa-Implementation of Mixes", In Proceedings of the International Conference on the Theory and Applications of Cryptographic Techniques (EUROCRYPT), Apr. 10, 1989, pp. 373-381.
Protalinski, Emil, "Facebook Scans Chats and Posts for Criminal Activity.", Retrieved from: https://www.cnet.com/news/facebook-scans-chats-and-posts-for-criminal-activity/, Jul. 12, 2012, 2 Pages.
Rackoff, et al., "Non-Interactive Zero-knowledge Proof of Knowledge and Chosen Ciphertext Attack", In Proceedings of the International Cryptology Conference (CRYPTO), Aug. 11, 1991, pp. 433-444.
Raymond, Jean-Francois, "Traffic analysis: Protocols, Attacks, Design issues and open Problems.", In Proceedings of the Workshop on Privacy Enhancing Technologies (PET), Dec. 19, 2000, 21 Pages.
Reed, et al., "Anonymous Connections and Onion Routing", In IEEE Journal on Selected Areas in Communications, vol. 16, Issue 4, May 1998, 16 Pages.
"Bleep", Retrieved from: http://www.bleep.pm, Aug. 8, 2019, 1 Page.
"ChatSecure", Retrieved from: https://chatsecure.org, Aug. 8, 2019, 9 Pages.
"Electronic Communications Privacy Act of 1986 (ECPA)", Retrieved from: https://it.ojp.gov/privacyliberty/authorities/statutes/1285, Oct. 1986, 3 Pages.
"European Convention on Human Rights: Article 8", Retrieved from: https://www.echr.coe.int/Documents/Convention_ENG.pdf, Nov. 1995, 34 Pages.
"Google Says Anything Flowing Across Open WiFi is Fair Game", Retrieved from: https://privacysos.org/blog/google-says-anything-flowing-across-open-wifi-is-fair-gam, Jan. 13, 2014, 5 Pages.
"Open Whisper Systems", Retrieved from: https://web.archive.org/web/20130124030355/https://whispersystems.org/, Jan. 24, 2013, 3 Pages.
"Rust-Crypto", Retrieved from: https://web.archive.org/web/20160211065317/https://github.com/DaGenix/rust-crypto/, Feb. 11, 2016, 2 Pages.
"Slack: Be Less Busy", Retrieved from: https://nicelydone.club/products/slack/, Aug. 26, 2019, 22 Pages.
"Telegram", Retrieved from: https://telegram.org, Aug. 8, 2019, 3 Pages.
"The Universal Declaration of Human Rights: Article 12.", Retrieved from: https://www.un.org/en/universal-declaration-human-rights/, Dec. 10, 1948, 8 Pages.
Aguilar-Melchor, et al., "XPIR: Private Information Retrieval for Everyone", In Proceedings on Privacy Enhancing Technologies Symposium, Apr. 1, 2016, pp. 1-20.
Angwin, et al., "AT&T helped U.S. spy on Internet on a Vast Scale", In The New York Times,, Aug. 15, 2015, 5 Pages.
Azar, et al., "Balanced Allocations", In Proceedings of Twenty-Sixth Annual ACM Symposium on Theory of Computing, May 23, 1994, 10 Pages.
Backes, et al., "AnoA: A Framework for Analyzing Anonymous Communication Protocols", In Proceedings of the IEEE Computer Security Foundations Symposium, Jun. 26, 2013, pp. 79-125.
Ball, James, "GCHQ Captured Emails of Journalists from Top International Media.", In Journal of the Guardian, Jan. 19, 2015, 4 Pages.
Bamford, James, "Shady Companies with Ties to Israel Wiretap the U.S. for the NSA", Retrieved from: https://www.wired.com/2012/04/shady-companies-nsa/, Apr. 3, 2012, 9 Pages.
Beimel, et al., "Buses for Anonymous Message Delivery", In Journal of Cryptology, vol. 16, No. 1, Jan. 1, 2003, 13 pages.
Beimel, et al., "Reducing the Servers Computation in Private Information Retrieval: PIR with preprocessing", In Proceedings of 20th Annual International Cryptology Conference Advances in Cryptology, Aug. 20, 2000, pp. 55-73.

(56) References Cited

OTHER PUBLICATIONS

Bellare, et al., "Authenticated encryption: Relations among Notions and Analysis of the Generic Composition Paradigm", In International Conference on the Theory and Application of Cryptology and Information Security (ASIACRYPT), Dec. 3, 2000, pp. 531-545.

Bellare, et al., "Pseudorandom Functions evisited: The Cascade Construction and its Concrete Security.", In Proceedings of 37th Conference on Foundations of Computer Science (FOCS), Oct. 14, 1996, pp. 514-523.

Bellare, et al., "Symmetric and dual PRFs from Standard Assumptions: A Generic Validation of an HMAC Assumption", In Proceedings of IACR Cryptology ePrint Archive, Dec. 2015, 17 Pages.

Berthold, et al., "Dummy Traffic Against Long Term Intersection Attacks", In Proceedings of the Workshop on Privacy Enhancing Technologies (PET), Apr. 14, 2002, 20 Pages.

Berthold, et al., "Web MIXes: A System for Anonymous and Unobservable Internet Access.", In Proceedings of the International Workshop on Designing Privacy Enhancing Technologies: Design Issues in Anonymity and Unobserbability, Jul. 25, 2000, pp. 115-129.

Borisov, et al., "DP5: A Private Presence Service", In Proceedings of Privacy Enhancing Technologies Symposium, Jun. 1, 2015, pp. 4-24.

Brakerski, et al., "Fully Homomorphic Encryption from Ring-LWE and Security for Key Dependent Messages", In Proceedings of the 31st Annual Conference on Advances in Cryptology, Aug. 14, 2011, pp. 505-524.

Buttar, Shahid, "Dragnet NSA Spying Survives: 2015 in Review", Retrieved from: https://www.eff.org/deeplinks/2015/12/dragnet-nsa-spying-survives-2015-review, Dec. 25, 2015, 13 Pages.

Cai, et al., "Touching from a Distance: Website Fingerprinting Attacks and Defenses", In Proceedings of the ACM Conference on Computer and Communications Security (CCS), Oct. 16, 2012, pp. 605-616.

Chaum, et al., "cMix: Anonymization by High-Performance Scalable Mixing", In Proceedings of the USENIX Security, Jan. 2016, 19 Pages.

Chaum, David, "The Dining Cryptographers Problem: Unconditional Sender and Recipient Untraceability", In Journal of Cryptology, Jan. 1, 1988, pp. 65-75.

Chaum, David, "Untraceable Electronic Mail, Return Addresses, and Digital Pseudonyms", In Proceedings of the Communications of the ACM, 24(2), Feb. 1981, pp. 84-88.

Chen, et al., "HORNET: High-Speed Onion Routing at the Network Layer", In Proceedings of the ACM Conference on Computer and Communications Security (CCS), Oct. 12, 2015, 17 Pages.

Chor, et al., "Private Information Retrieval", In Proceedings of IEEE 36th Annual Foundations of Computer Science, Jun. 29, 1997, 21 Pages.

Chor, et al., "Private Information Retrieval by Keywords", In Report of Technion-IIT, Department of Computer Science, 1997, 19 Pages.

Clarke, et al., "Freenet: A Distributed Anonymous Information Storage and Retrieval System", In Proceedings of the International Workshop on Designing Privacy Enhancing Technologies: Design Issues in Anonymity and Unobserbability, Jul. 1, 2001, 21 Pages.

Cole, David, "We Kill People based on Metadata", In The New York Review of Books, May 10, 2014, 5 Pages.

Cook, Tim, "A Message to Our Customers", Retrieved from: https://www.apple.com/customer-letter/, Feb. 16, 2016, 3 Pages.

Cooper, et al., "Preserving Privacy in a Network of Mobile Computers", In Proceedings of the IEEE Symposium on Security and Privacy, May 8, 1995, 13 Pages.

Corrigan-Gibbs, et al., "Dissent: Accountable Anonymous Group Messaging", In Proceedings of the 17th ACM conference on Computer and communications security,, Oct. 4, 2010, pp. 340-350.

Corrigan-Gibbs, et al., "Proactively Accountable Anonymous Messaging in Veredict", In Proceedings of the 22nd {USENIX} Security Symposium ({USENIX} Security, Aug. 2013, pp. 147-162.

Corrigan-Gibbs, et al., "Riposte: An Anonymous Messaging System Handling Millions of Users", In Proceedings of IEEE Symposium on Security and Privacy, May 17, 2015, 25 Pages.

Danezis, et al., "Drac: An Architecture for Anonymous Low-Volume Communications", In Proceedings of the Privacy Enhancing Technologies Symposium (PETS),, Jul. 2010, 18 Pages.

Danezis, et al., "Low-Cost Traffic Analysis of Tor", In Proceedings of the IEEE Symposium on Security and Privacy, May 8, 2005, 13 Pages.

Danezis, et al., "Mixminion: Design of a type III Anonymous Remailer Protocol", In Proceedings of the IEEE Symposium on Security and Privacy, May 11, 2003, 14 Pages.

Danezis, et al., "Systems for Anonymous Communication", Retrieved from: https://securewww.esat.kuleuven.be/cosic/publications/article-1335.pdf, Aug. 31, 2009, 61 Pages.

Devet, et al., "Optimally Robust Private Information Retrieval.", In Proceedings of the USENIX Security Symposium,, Aug. 2012, 15 Pages.

Diffie, et al., "New Directions in Cryptography.", In Proceedings of IEEE Transactions on Information Theory, vol. 22, Issue 6, Nov. 1976, pp. 644-654.

Dingledine, Roger, "Did the FBI Pay a University to Attack Tor users?", In Tor Project (blog), Nov. 12, 2015, 5 Pages.

Dingledine, et al., "Tor: The Second-Generation Onion Router", In Proceedings of the 13th Conference on USENIX Security Symposium,, Aug. 9, 2004, 18 Pages.

Douceur, John, "The Sybil Attack", In Proceedings of the International workshop on peer-to-peer systems, Mar. 7, 2002, 6 Pages.

Dworkin, Morris, "Recommendation for block cipher modes of operation: Galois/Counter Mode (GCM) and GMAC", Technical Report SP 800-38D, National Institute of Standards and Technology, Nov. 2007, 39 Pages.

\* cited by examiner

MULTIPLE MESSAGE RETRIEVAL FOR SECURE ELECTRONIC COMMUNICATION

CROSS-REFERENCE TO RELATED APPLICATIONS

This application is a continuation of and claims priority to U.S. Non-Provisional application Ser. No. 15/295,608, filed Oct. 17, 2016 and titled "MULTIPLE MESSAGE RETRIEVAL FOR SECURE ELECTRONIC COMMUNICATION", which is hereby incorporated by reference herein in its entirety.

BACKGROUND

Keeping communication private has become increasing important in an era of mass surveillance and cyberattacks. For example, government officials and business leaders travel to hostile locations and rely on local, untrusted infrastructure to communicate using mobile devices and computers. Additionally, even in friendly locations, servers and internet service providers may be untrusted. Many people are also concerned that communication is being monitored by private parties and government agencies. Not only are people concerned with content of communication being discovered, but metadata surrounding the communication as well. Metadata may contain information about the communication including identities of parties that sent and received the communication, a time of the communication, and a frequency of the communication. Although communication may be encrypted to protect content of the communication, maintaining privacy of associated metadata is an increasingly important challenge.

Conventional methods attempting to protect metadata of communication are either insufficiently secure or limited by network and other computing costs. When a user attempts to receive a high volume of communication through a sophisticated secure communication system, the user may be compelled to bear high network or other computing costs and/or delay receiving communications because of the high network or other computing costs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for multiple message retrieval for secure electronic communication are described. The techniques, for instance, utilize a server and computing devices employing a private information retrieval scheme to allow a receiving device to locate multiple electronic communications on a server, request delivery of the multiple electronic communications without the server being aware of which electronic communication are requested, and receive the electronic communications without the server being aware of which electronic communications were sent. For example, the server may utilize an efficient electronic communication storage structure for storing and retrieving multiple electronic communications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
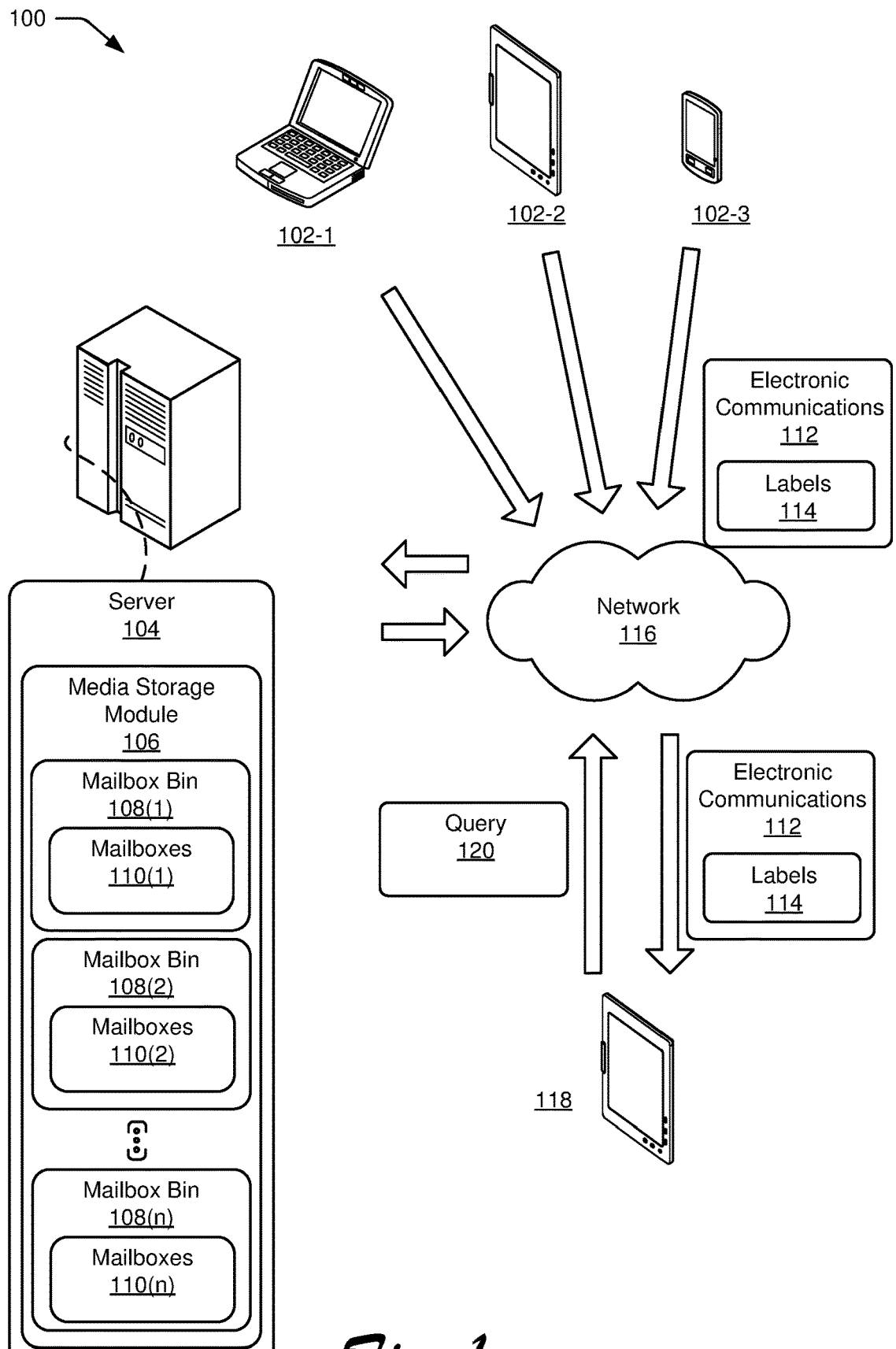
FIG. 1 is an illustration of an example environment in accordance with one or more implementations.

Conventional methods of electronic communication rely on data encryption to protect content of the electronic communication. Although encrypting the content of electronic communication is important, it may also be important to protect metadata relating to identification of a relationship of a sender and receiver, timing of a communication between the sender and receiver, frequency of communication between the sender and receiver, and so forth. Some attempts to securely communicate while protecting metadata rely on a trusted internet service provider (ISP) or proxy server to protect the metadata. However, when a trusted server is not accessible, metadata will not be protected. Additionally, governments and other parties may force a trusted ISP or proxy server to reveal the protected metadata, thus reducing confidence in relying on an ISP.

Techniques are described to efficiently exchange a plurality of electronic communications and protect metadata surrounding the electronic communications. Examples of metadata include data relating to identification of a relationship of a sender and receiver, timing of a communication between the sender and receiver, and frequency of communication between the sender and receiver, and so forth. This may be accomplished using a multi-retrieval scheme with a private information retrieval scheme such that a receiving device is able to locate and retrieve a plurality of electronic communications from a server while protecting the metadata from the server including which electronic communications were located and retrieved.

In an example implementation, a plurality of sending devices send at least one encrypted message having at least one label to a server and for receipt by a receiving device. The label is appended to the encrypted message to identify the encrypted message so that the encrypted message is retrievable by an intended recipient. In comparison with conventional communications of messages where a message is identified with one or more of a sender or an intended recipient, using a label does not communicate an identity the intended recipient. The server then stores each of the encrypted messages into at least one mailbox having a corresponding label. The mailboxes are sorted into mailbox bins of the server defined by a range of mailbox labels that are stored therein. The mailbox bins are indexed into hierarchal data structures, such as binary search trees based on labels of mailboxes stored therein. An index matrix, or vector, is generated by the server to represent locations of each of the mailboxes in the mailbox bins. In some implementations, a single encrypted message has two labels and is stored in two different mailboxes having corresponding labels. In some of these mailboxes, the labels are generated such that the two different mailboxes will be stored in two different bins.

According to one or more implementations, a receiving device sends a query to the server to locate a target mailbox in each of a plurality of the mailbox bins. For instance, before sending the query, the receiving device discovers the ranges of labels defining each of the mailbox bins. In at least some implementations, the receiving device knows the labels of target mailboxes, based on a shared secret or shared key with a sender of each electronic communication stored in the target mailboxes, and the receiving device is able to target a plurality of bins for a target mailbox in each mailbox bin. The query, for example, includes querying each mailbox bin of the plurality of mailbox bins, even if a mailbox bin does not contain a target mailbox, further hiding identities of target mailboxes and protecting metadata.

In some implementations, the query includes a series of probes that continue to probe after the indexed location of the electronic communication has been found in a mailbox bin. Continuing to probe may be helpful in protecting metadata by preventing the server from determining which encrypted message the receiving device is attempting to locate.

According to various implementations, after determining an indexed location of a target mailbox in a bin, the receiving device sends a query matrix, or query vector, to the mailbox bin. The receiving device, for instance, may send a set of query matrices including a query matrix directed to each mailbox bin. Each of the query matrices are configured with encrypted entries that encrypt to zero at all entries except for a location corresponding to the target mailbox in each of the plurality of mailbox bins. This query vector generation process uses an encryption system that is additively homomorphic. That is, the encryption system allows the server to perform an operation on two ciphertexts (e.g., Enc(a) and Enc(b)) to obtain a ciphertext that corresponds to the sum of those encrypted values Enc(a+b). Furthermore, such an encryption system allows computing Enc(c*a) starting with c and Enc(a) via repeated addition of Enc(a) with itself c times, enabling the computation of a dot product between an encrypted vector and a plaintext vector. Thus, each query matrix is configured such that when the query matrix is multiplied with the index of the mailbox bin to which it is sent, the content of all but the target mailbox is filtered. In an example implementation, the query matrix is in vector form ("query vector") and a dot product is performed to multiply the query vector and the index of the mailbox bin to which it is sent. The result of multiplying the query matrix and the index of the mailbox bin is then delivered to the receiving device. Because the server is unable to decrypt the entries of the query matrix, the server is unaware of which mailbox was used to store the delivered encrypted message. Thus, the encrypted message is received from the sending device and delivered to the receiving device without the server being able to detect a relationship between the sending device and the receiving device.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that may be employed to perform various techniques described herein.

Example Environment

FIG. 1 illustrates an environment 100 in an example implementation for securely communicating while protecting metadata using multi-retrieval that is operable to employ the techniques as described herein. The illustrated environment 100 includes sending computing devices 102-1, 102-2, and 102-3 for creating or selecting media content for sending as a secure communication to a server 104. By way of example, and not limitation, computing devices 102-1, 102-2, and 102-3 may be any combination of computing devices such as laptop computing devices, tablet computing devices, mobile phones, desktop computers, or wearable smart devices.

The server 104 includes media storage module 106 comprising mailbox bin 108(1) through mailbox bin 108(n) for storing mailboxes 110(1) through 110(n). During a sending phase, or after a sending phase has completed, electronic communications 112 are stored in mailboxes 110(1)-110(n), each having a label 114 corresponding to a label 114 appended to the electronic communication stored therein. In some implementations, the server 104 generates mailboxes 110(1)-110(n) in response to receiving the electronic communications 112. The mailboxes 110(1)-110(n) are then stored in one of mailbox bins 108(1)-108(n).

Mailbox bins 108(1)-108(n) may be defined by label ranges of the mailboxes 110(1)-110(n) stored therein. For example, the mailbox bin 108(1) may be defined as a mailbox bin for storing mailboxes 110(1) ranging from 1-100, mailbox bin 108(2) may be defined as a mailbox bin for storing mailboxes 110(2) ranging from 101-200, and mailbox bin n may be defined as a mailbox bin for storing mailboxes 110(n) from 201-300.

The server 104 is configured to communicate over a network 116 to receive electronic communications 112 from computing devices 102-1, 102-2, and 102-3 and send electronic communications 112 to a receiving computing device 118. Receiving computing device 118 is configured to retrieve the electronic communications 112 using a multi-retrieval system in connection with a private information retrieval scheme including submitting a query 120 via the network 116 to request and locate the contents of target mailboxes in a plurality of mailbox bins 108(1)-108(n) based on labels 114 while protecting metadata surrounding the electronic communications.

Sending computing devices 102-1, 102-2, and 102-3 and computing device 118 may be configured as full resource devices with substantial memory and processor resources (e.g., personal computers, game consoles, or terminal computing devices), a mid-resource device with moderate memory and resources (e.g., a netbook), or a low-resource device with limited memory and/or processing resources (e.g., mobile devices, automobile computing devices, or wearable smart devices). Server 104 may be representative of one or a plurality of different devices, such as multiple servers utilized by a business to perform operations "over the cloud" as further described in relation to FIG. 10.

Figure 2:
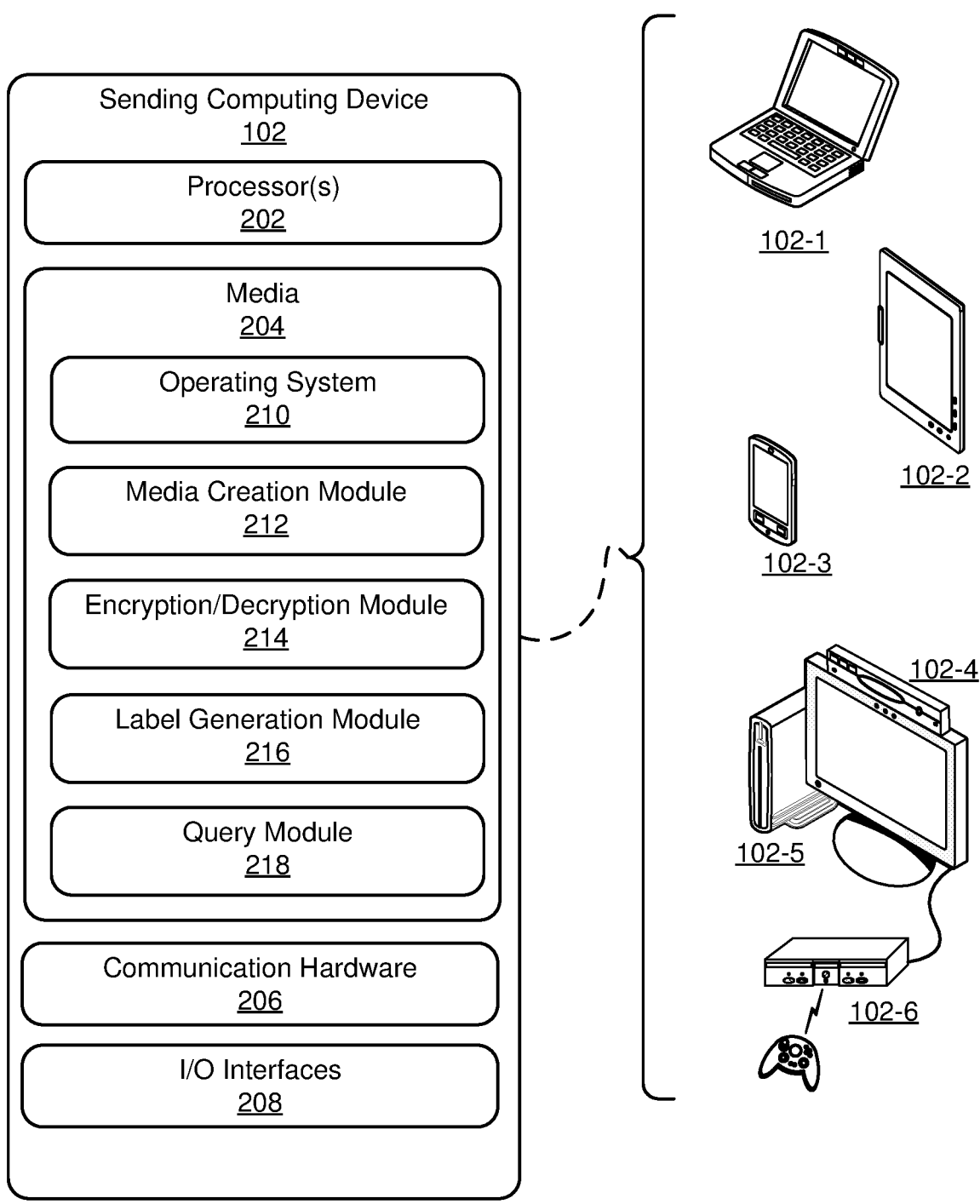
FIG. 2 is an illustration of an example local computing device in accordance with one or more implementations.

FIG. 2 illustrates an example implementation of one or more of computing devices 102-1, 102-2, and 102-3 of FIG. 1, which represent implementations of the sending computing device 102, and may also represent an example implementation of computing device 118 of FIG. 1. Sending computing device 102 is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Sending computing device 102 includes or has access to computer processor(s) 202, computer-readable storage media ("media") 204, communication hardware 206, and I/O interfaces 208. Examples of the I/O interfaces 208 include a display, a touch sensitive input, a keyboard, a gaming remote, etc. Media 204 includes an operating system 208, media creation module 212, encryption/decryption module 214, label generation module 216, and query module 218.

Generally, when sending one or more of electronic communications 112 by computing device 102, a user may interact with I/O interfaces 208 to select or generate electronic media for sending. In at least some implementations, operating system 210 facilitates using media creation module 212 to create a message, document, drawing, presentation, spreadsheet or any other form or combination of electronic media for sending as electronic communication 112. Alternatively or additionally, operating system 210 facilitates choosing existing electronic media as part of electronic communication 112.

Once electronic communication 112 is created or selected, it is encrypted using encryption/decryption module 214 and at least one a label 114 is generated to identify the electronic communication 112. In at least some implementations, the encryption is performed using an encryption key that is generated based on a known secret shared between computing device 102-1, 102-2, or 102-3 and computing device 118. To decrypt a message using the encryption/decryption module, computing device 118 uses a decryption key corresponding to the encryption key that may also be based on the shared secret. After encryption, content of the electronic communication 112 is considered secure.

Sending computing device 102 then sends the encrypted electronic communication 112 to the server 104 along with at least one corresponding label 114 generated by label generation module 216. In some implementations, electronic communications 112 are sent with two distinct labels 114 that are configured to result in one copy of one of electronic communications 112 being stored in one mailbox bin and another copy of the one of electronic communications 112 being store in another mailbox bin of media storage module 106. In some implementations, labels 114 are generated based on the shared secret between one or more of computing devices 102-1, 102-2, or 102-3 and computing device 118 so that computing device 118 is aware of the label 114 for which it is looking. According to various implementations, the electronic communications 112 are sent to the server 104 with a label 114 that does not identify an intended recipient. Accordingly, metadata surrounding the electronic communication 112 is protected from the server 104 including metadata relating to identification of a receiver and a relationship existing therewith between a sender and a receiver.

Figure 3:
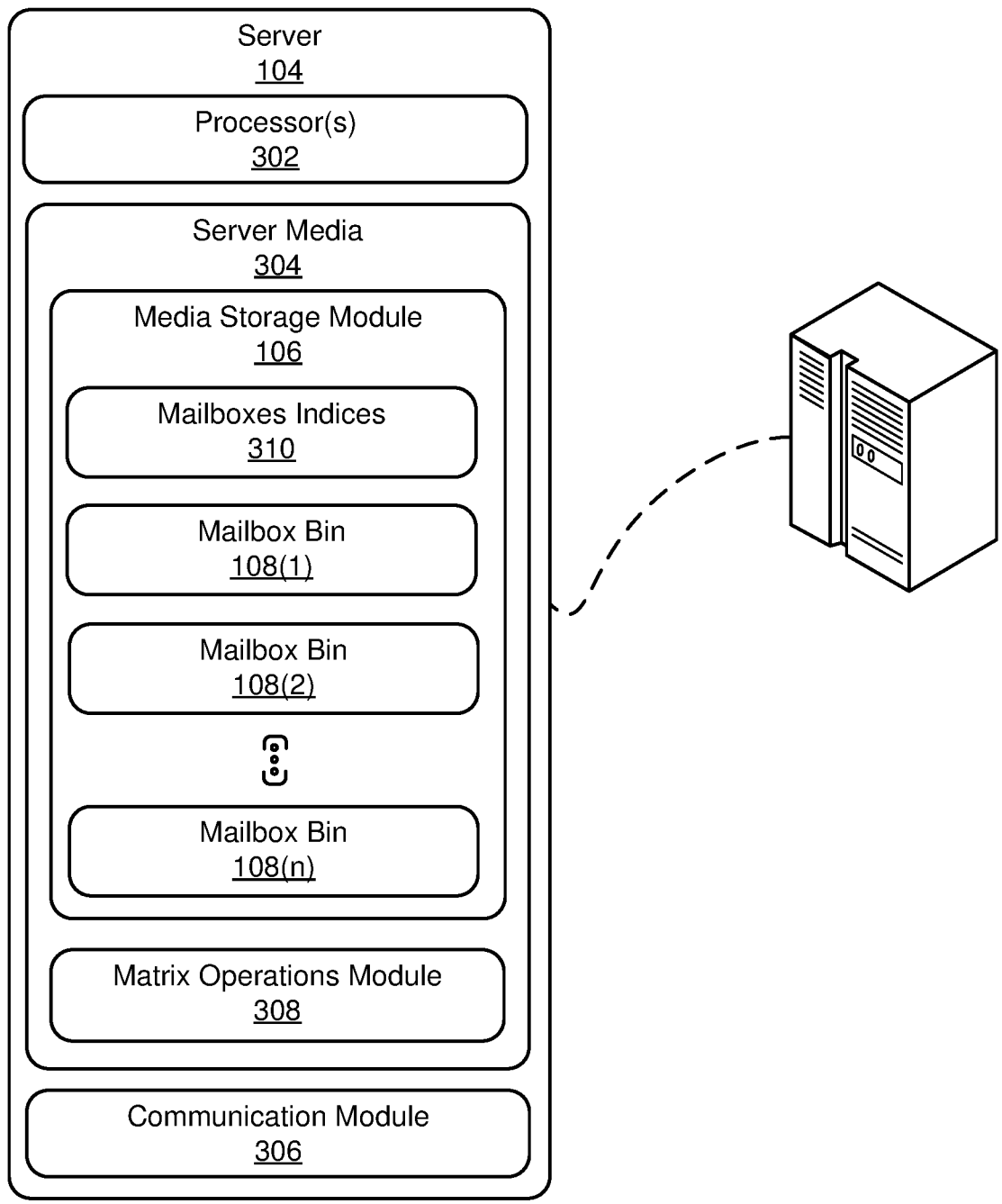
FIG. 3 is an illustration of an example server in accordance with one or more implementations.

FIG. 3 illustrates an example implementation of the server 104 in further detail. The server 104 is shown as a singular entity for visual brevity, though multiple devices may instead be used. The server 104 includes or has to access to processor(s) 302 computer-readable storage media 304 (server media 304), and communication module 306. Media 304 includes or has access to a media storage module 106 and a matrix operations module 308, and the media storage module 106 includes mailboxes indices 310 and mailboxes bins 108(1)-108($n$) (including mailbox bin 108(2)).

In some implementations, mailbox bins 108(1)-108($n$) are partitioned into mailbox bins having static label space values. Alternatively or additionally, mailbox bins 108(1)-108($n$) are configured after a predetermined time has elapsed for sending electronic communications (a sending phase) such that a quantity of mailboxes in each mailbox bin are roughly equal.

Figure 4:
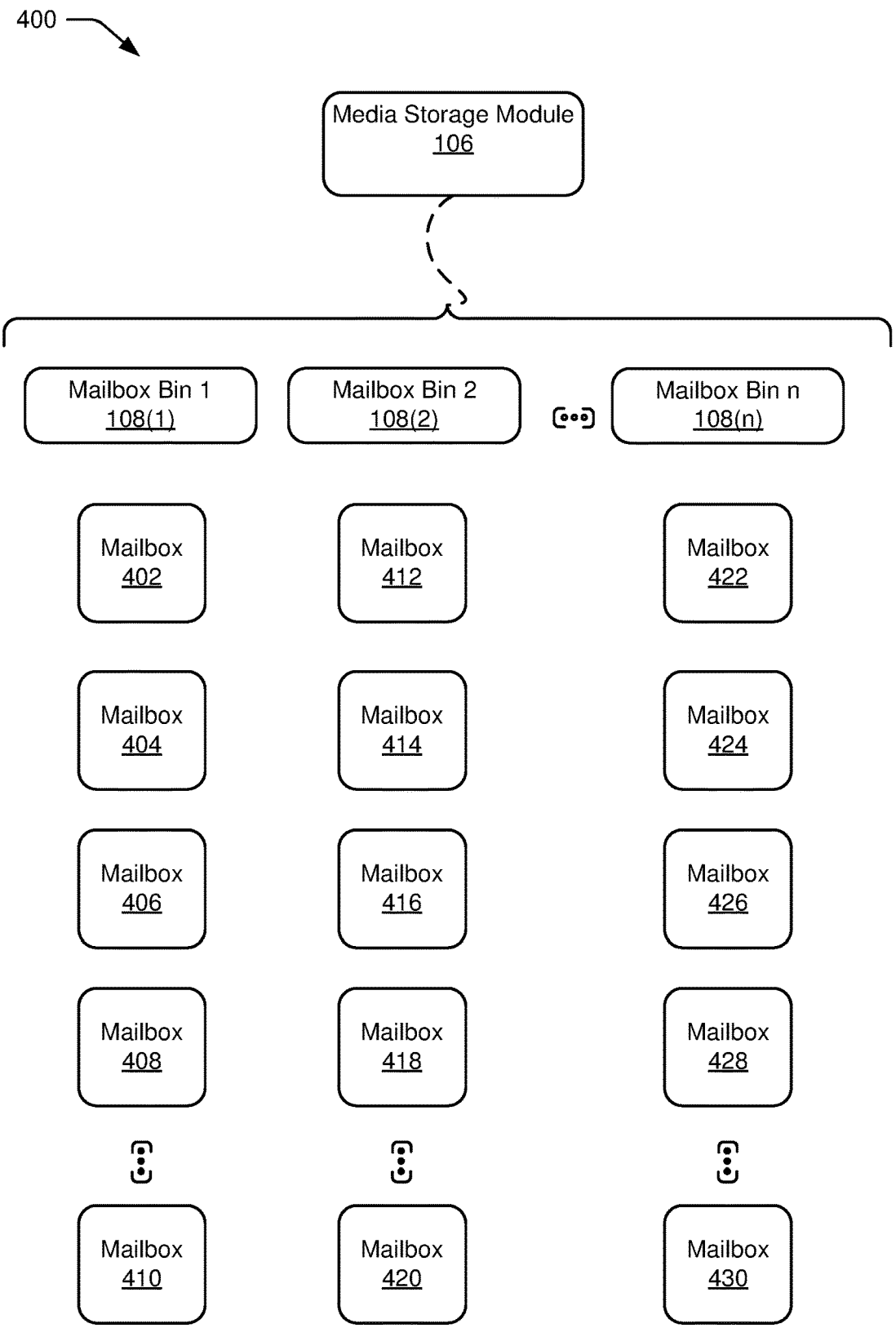
FIG. 4 is an illustration of an example media storage module in accordance with to one or more implementations.
Figure 5:
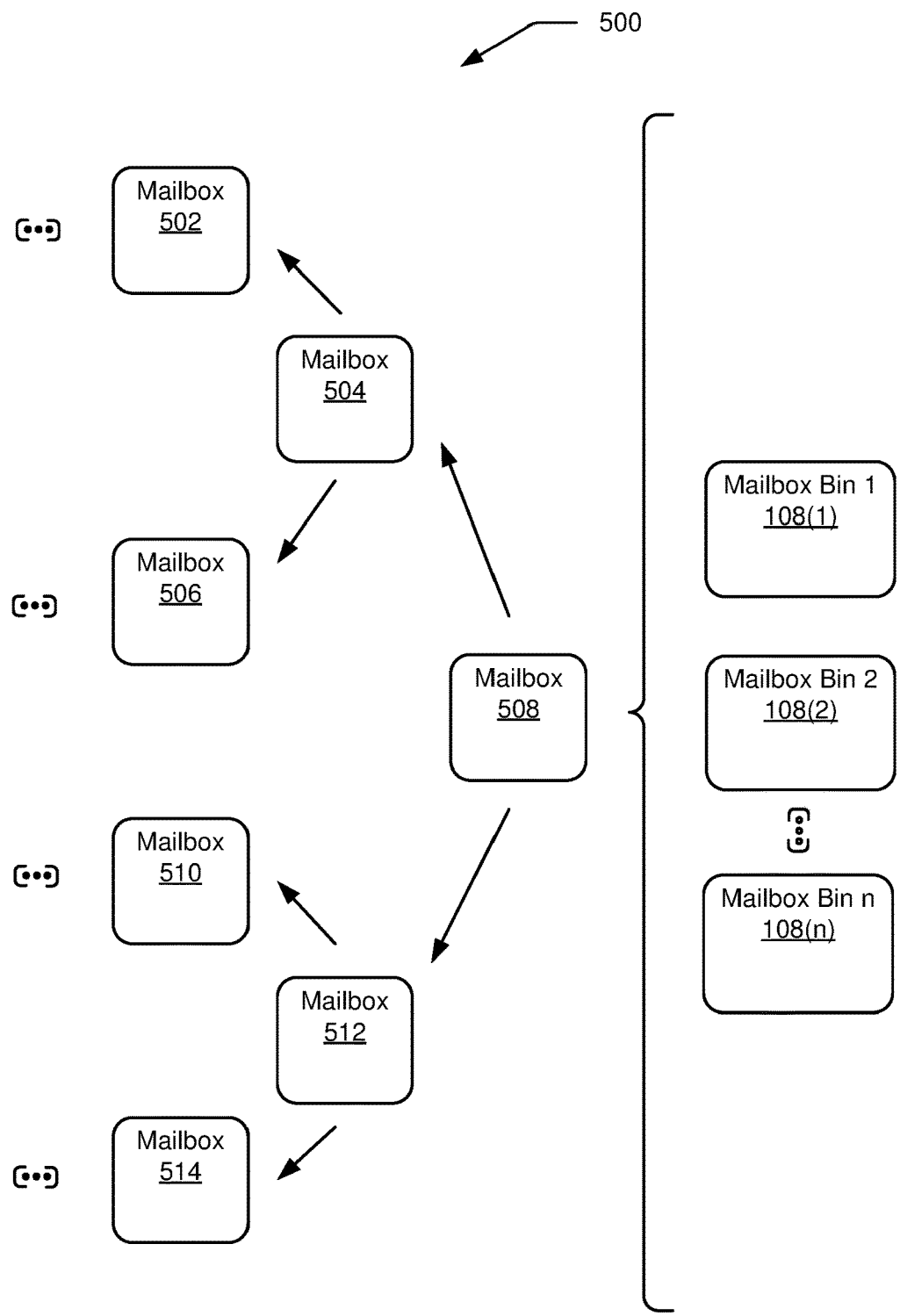
FIG. 5 is an illustration of a mailbox bin according to one or more implementations.
Figure 6:
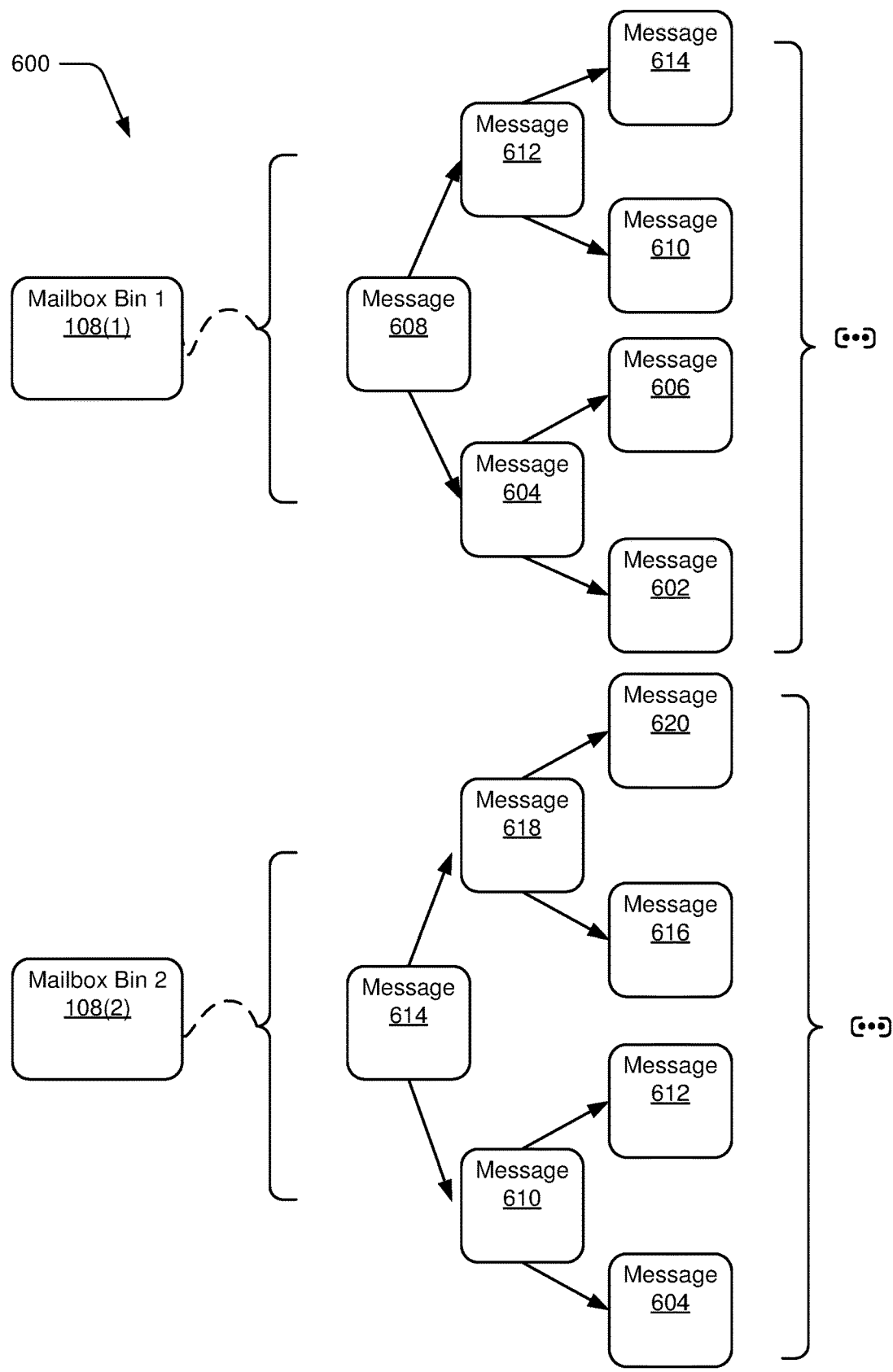
FIG. 6 is an illustration of an example media storage module in accordance with one or more implementations.

According to one or more implementations, each mailbox bin is configured to store all mailboxes within the range of labels defining the mailbox bin. In some implementations, a quantity of mailbox bins is equal to a quantity of electronic communications 112 that computing device 118 is permitted to receive from the server 104 in a single receive phase. For instance, mailboxes indices 310 updates index entries for each of the mailbox bins based on the electronic communications 112 received, examples of which are illustrated in FIGS. 4-6. As shown in FIGS. 5-6, some implementations of the mailboxes indices 310 order the mailbox bins 108(1)-108($n$) into a hierarchal structure such as a binary search tree to facilitate efficient and private locating of a target mailbox. In some implementations, as shown in FIG. 6, electronic communications 112 may be sent with more than one label 114, and thus may be stored in more than one mailbox bin. Once a configuration of mailbox bins 108(1)-108($n$) is complete, the server 104 may send mailbox bin information to users including quantities of mailboxes stored in each of the mailbox bins 108(1)-108($n$).

Alternatively or additionally, mailbox bins 108(1)-108($n$) may be configured using batch codes. In an example implementation of using sub-cube batch codes, a candidate batch code, in generating mailbox bins, the server 104 includes a first mailbox bin and a second mailbox bin, e.g., 108(1) and 108(2), with the first mailbox bin storing a first half of mailboxes sorted alphanumerically by respective labels 114 and the second mailbox bin storing a remaining second half of mailboxes sorted alphanumerically by respective labels 114. The first and second mailbox bins are organized into binary search trees to facilitate querying. Further, the server 104 generates a third mailbox bin, e.g., 108($n$), and structures the third mailbox bin $b_3$ as a binary search tree from the first and second mailbox bins as follows: For every level i and index j, $b_3(i,j) = b_1(i,j) \oplus b_2(i,j)$, where $b_1$ is the first mailbox bin and $b_2$ is the second mailbox bin. In this configuration, $b_3$ is not ordered, so it is not a binary search tree and cannot be user directly for querying. The server 104 then communicates a lowest label of $b_2$ to computing device 118 so that computing device 118 can determine whether two target mailboxes are contained in a same mailbox bin $b_1$ or $b_2$. If the two target mailboxes are in different mailbox bins, computing device 118 queries each of $b_1$ and $b_2$ to locate and retrieve the two target mailboxes. If the two target mailboxes are in the same bin, for example, $b_1$ computing device 118 can locate and retrieve one mailbox from $b_1$ and the other from $b_3$ using joint tree traversal as part of a query.

To perform joint tree traversal, a computing device 118 retrieves a pair of labels 114 and encrypted content (a tuple) from the first level of $b_1$ and $b_3$. While the tuples of the first level $b_1$ and $b_3$ may be irrelevant to the query, they may be used to compute {Label, content}=(tuple)$_1 \oplus$(tuple)$_3$. The computing device 118 can then compare Label$_2$ and Label to determine whether to probe up or down in the next level of $b_3$. If Label$_2$=Label computing device 118 has located the target encrypted message in $b_3$. Sub-cube batch codes, such as the example discussed, may be combined with the multiple mailbox bin structure disclosed herein to increase a quantity of mailboxes that can be retrieved from the server 104 without repeating a query process.

Returning again to local computing device 102 of FIG. 2 as an example illustration of computing device 118, computing device 118 sends the query 120 using query module 218 and communication hardware 206 via the network 116 to the server 104, and the server 104 receives the query 120 via the communication module 306. A first component of the query 120 is used to locate a target mailbox in each mailbox bin storing a target mailbox. In some implementations, before sending the query 120, computing device 118 may determine a mailbox content retrieval strategy for locating and requesting target mailboxes in one iteration of query based on mailbox bin information such as ranges of labels 114 stored in each mailbox bin. For example, if a first electronic communication is stored in mailboxes located in a first and third mailbox bin, a second electronic communication is stored in mailboxes located in a first and second mailbox bin, a third electronic communication is stored in mailboxes located in a second and fourth mailbox bin, and a fourth electronic communication is stored in mailboxes located in the first and third mailbox bin, then the receiving device may determine that it will probe for the first electronic communication in the first mailbox bin, the second target electronic communication in the second mailbox bin, the third electronic communication in the fourth mailbox bin, and the fourth electronic communication in the third mailbox bin.

Locating a target mailbox in each mailbox bin storing a target mailbox may include a request for all mailbox indices 310. However, when the mailbox indices are very large, this may not practical because of the computing cost, and possible monetary cost, of sending high volumes of data via network 116. Alternatively or additionally, the first component of the query 120 may include a series of probes, the probes being configured to locate the target mailbox and determine its indexed location within its mailbox bin based on the label 114 of the target mailbox. Such probes may use a private information retrieval protocol (discussed below) to avoid leaking to the server an identity of a probed mailbox. Generally, a probe involves choosing a location of the index as an initial "guess," privately retrieving a label 114 at that location (without revealing to the server which label was retrieved, and refining the guess for a following probe until a target mailbox is located. A probe process, for instance, represents a search algorithm that searches using a label 114 to locate a target mailbox. In some implementations where the mailbox bins 108(1)-108(n) are organized into a hierarchal structure, the first component of the query 120 may also include a request for the highest levels of the hierarchal structure for more efficient probing. For instance, an index of a level of hierarchal structure, e.g., a binary search tree, may be derived from information gathered from the result of a previous probe and semantics of the hierarchal data structure In at least some implementations, each probe of the query 120 may be directed based on a result of a previous probe and semantics of the hierarchal structure. Further, the query 120 may continue to dummy probe the index of mailbox bin 108(1) to obfuscate that the query was searching for the target mailbox. Probing may be repeated for each mailbox bin 108(1)-108(n) containing a target mailbox, or alternatively, this process may be repeated for each mailbox bin 108(1)-108(n) regardless of whether a mailbox bin contains a target mailbox. If probing a mailbox bin that does not contain a target mailbox, probing may include a series of random probes ("dummy probes") configured to simulate probing that is locating a target mailbox. In some of these implementations, a quantity of times probing is repeated is a predetermined quantity and is performed on each mailbox bin to hide from the server the identity of the mailbox bin containing an additional target mailbox.

After locating the target mailboxes in the mailbox bins 108(1)-108(n), computing device 118 generates a second component of the query 120, query vectors, using the query module 218. For simplicity, implementations using a query vector are discussed, but a query matrix m be substituted for a query vector with matrix multiplication substituted for a dot product computation. The first component of the query 120 may be referred to as the query and the second component of the query 120 may be referred to as the query vector and/or query matrix. As discussed above, query vectors are configured such that, after performing a dot product with the index of the target mailbox bin, unwanted content from the rest of mailboxes stored in the target mailbox bin is filtered away and only content of the target mailbox remains isolated. The computing device 118 sends query vectors targeting a plurality of mailbox bins to the server 104 via the network 116. In some implementations, computing device 118 sends query vectors targeting each of the mailbox bins 108(1)-108(n), sending a dummy query vector to the mailbox bins not containing any target mailboxes. The dummy query, for instance, may have ciphertext entries encrypted to 0 at all entries and may be configured to imitate querying without indexed locations of target mailboxes to find. The server then carries out matrix operations using the matrix operations module 308 to multiply the encrypted entries of the query matrices with entries of the target mailbox bins, the results of which are sent via communication module 306 to computing device 118 via the network 116.

Thus, computing devices 102-1, 102-2, and 102-3 may send a plurality of electronic communications 112 to the second computing device 118 while protecting metadata surrounding the electronic communications 112. The metadata, for instance, relates to identification of a relationship between computing device 102 and computing device 118.

FIG. 4 illustrates an example implementation 400 of mailboxes being stored in a simple list structure in mailbox bins 108(1), 108(2), and 108(n). Mailbox bin 108(1) is configured to store mailboxes having labels between a label of mailbox 402 and a label of mailbox 410. Mailbox bin 108(2) is configured to store mailboxes having labels between a label of mailbox 412 and a label of mailbox 420. Mailbox bin 112-n is configured to store mailboxes having labels between a label of mailbox 422 and a label of mailbox 430. When the quantity of mailboxes 110(1)-110(n) stored in each of the mailbox bins 108(1)-108(n) is low, the illustrated list structure may allow the query 120 to efficiently locate the first mailbox. When using a single layer list structure, a query may locate a target mailbox in a mailbox bin by generating a series of probes directed to the mailbox bin. For example, if a mailbox 404 is the target mailbox and has a label 114 known by the receiving device to be 4, a first probe may be directed at mailbox 408 and return a label of 8. Because the returned label is higher than the label of the target mailbox, a second probe may be directed at mailbox 406 and return a label of 6. Again, because the returned label is higher than the label of the target mailbox, a third probe may be directed at mailbox 404, and return a label of 4. Because this is the label 114 of the target mailbox, the query has located an indexed location of the target mailbox. The query may continue probing additional mailboxes, e.g., 402 and 410, to obfuscate that the query was searching for mailbox 404. In some implementations, a quantity of probes may be equal to a quantity of levels of the binary search tree to obfuscate an identity of the targeted mailbox.

FIG. 5 illustrates an example implementation 500 of one of mailbox bins 108(1)-108(n) being organized into a binary search tree hierarchal structure with the highest levels of the binary search tree including mailboxes 508, 504, 512, 502, 506, 510, and 514. Each level of the binary search tree, for example, is populated with a mailbox label 114 to improve efficiency of the query 120. The highest level of the binary search tree, mailbox 508, has a label 114 that is generally near the median of the mailboxes stored in the mailbox bin shown. A first probe may determine that mailbox 508 has a label of 50. If the query 120 is searching for a mailbox that is alphanumerically lower than 50, the next probe will target the second level of the binary search tree that is lower than 50, mailbox 504. Alternatively, if the query 120 is searching for a mailbox that is alphanumerically higher than 50, the next probe will target the second level of the binary search tree that is higher than 50, mailbox 512. Probing will continue until the target mailbox is located. To hide the identity of the target first mailbox, query 120 may continue probing after the first mailbox is located. For instance, the query 120 is configured to perform n quantity of probes after the target mailbox is located to obfuscate that the target mailbox has already been located. In at least some of these implementations, n is a random quantity.

In some implementations, the query 120 may request a plurality of levels, e.g., the highest levels, of the binary search tree and choose to begin probing at one of mailboxes 502, 506, 510, or 514 based on the highest levels. In the illustrated implementation, requesting the highest levels of the binary search tree may increase efficiency and lower computing costs by replacing two probe iterations. In some implementations, the highest levels of the binary search tree may be defined as a predetermined quantity of highest levels of the binary search tree. In other implementations, the highest levels of the binary search tree may be defined as a predetermined percentage of highest levels of the binary search tree.

FIG. 6 illustrates an example implementation 600 of mailbox bins 108(1) and 108(2) storing mailboxes having messages (electronic communications 112) in binary search tree structures. As illustrated, messages 614, 612, 610, and 604 are found in both mailbox bins. This is a result of computing devices 102-1, 102-2, and/or 102-3 sending electronic messages with at least two labels 114. Each of messages 614, 612, 610, and 604 are stored in two mailbox bins because, even though the messages are identical (after decrypting), the labels 114 are different. As an example of the benefits of sending electronic messages with at least two labels 114, consider an example where messages 610 and 612 are both target messages. Without the messages being stored under two different labels 114, both may be sorted into the same mailbox bin. This would mean that computing device 118 would have to repeat the query to retrieve both messages out of the same mailbox bin. However, repeating the query based on not receiving all of target messages from a mailbox bin may reveal metadata to the server 104.

Therefore, to avoid revealing metadata to the server 104, the query may be repeated a predetermined quantity of times, regardless of how many target mailboxes are located in a single mailbox bin. In at least some implementations, the query is repeated in every mailbox bin the same quantity of times. Alternatively or additionally, as shown in FIG. 6, computing device 118 may determine that it can locate and request message 610 from mailbox bin 108(1) and message 612 from mailbox bin 108(2) in a single query because message 610 is identified by two labels 114. As discussed above, the query may continue to probe the binary search tree after locating a target mailbox and may deliver a query vector to a mailbox bin not containing any target mailboxes to hide the identity of the target mailboxes.

Example Methods

The following discussion describes methods for efficiently exchanging electronic communication securely using multi-retrieval systems and while providing relationship unobservability and protecting other metadata. Aspects of each of the methods may be implemented in hardware, firmware, or software, or a combination thereof. The methods are shown as a set of blocks that specify operations performed by one or more devices and are not necessarily limited to the orders shown for performing the operations by the respective blocks. In portions of the following discussion, reference will be made to FIGS. 1-3.

Figure 7:
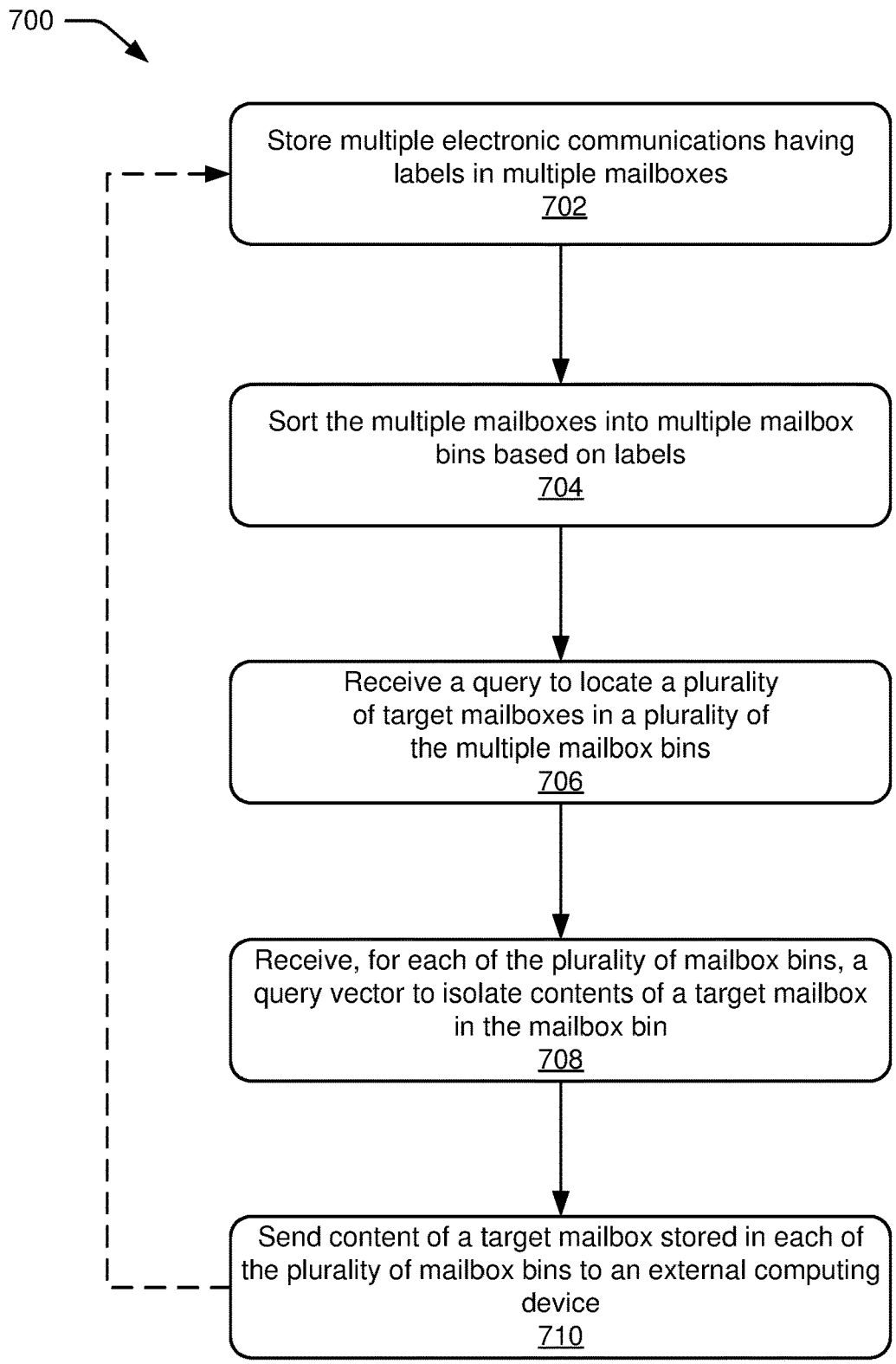
FIG. 7 is a flow diagram that describes operations in a method in accordance with one or more implementations.

FIG. 7 depicts method 700 in an example implementation in which a server 104 facilitates multi-retrieval of electronic communications 112 while maintaining privacy of associated metadata. By doing so, users are able to more efficiently, more quickly, and with reduced computing and networking costs, communicate without fear of metadata, including relationships between users, being discoverable by hostile or other unwanted parties.

At operation 702, multiple electronic communications having labels are stored in multiple mailboxes. The server 104, for instance, stores multiple electronic communications 112 having labels 114 in multiple mailboxes. In some implementations, a specified interval of time is defined as a receive phase in which electronic communications 112 may be received by the server 104. As discussed above, each of electronic communications 112 has at least one label 114 and is stored in a mailbox having a corresponding label 114.

At operation 704, the multiple mailboxes are sorted into multiple mailbox bins based on the labels. For example, the server 104 indexes the multiple mailboxes 110(1)-110(n) into multiple mailbox bins based on labels 114. This includes depositing the multiple mailboxes 110(1)-110(n) into mailbox bins, each configured to receive, store, and index mailboxes 110(1)-110(n) within a designated range of labels 114. The designated ranges may be mutually exclusive between mailbox bins. In some implementations, indexing electronic communications 112 may be performed continuously as electronic communications 112 are received. Alternatively, or additionally, indexing may be performed after conclusion of a receive phase. In at least some implementations, the mailboxes within each mailbox bin are indexed into a binary search tree to facilitate efficient querying.

At operation 706 a query is received to locate a plurality of target mailboxes in a plurality of the mailbox bins. Server 104, for instance receives a query 120 from computing device 118 to locate target mailboxes in each of a plurality of the multiple mailbox bins from computing device 118 based on the labels 114 of the target mailboxes. In at least some embodiments, the query includes one or more probes to locate indexed locations of at least one target mailbox in each of a plurality of the multiple mailbox bins. In some implementations, the query 120 includes probing mailbox bins that do not contain a target mailbox to further protect identities of the target mailboxes.

At operation 708, query vectors are received for each of the plurality of mailbox bins to isolate contents of a target mailbox in the mailbox bin. For example, the server 104 receives query vectors from computing device 118 to isolate contents of a target mailbox within each of the plurality of mailbox bins and filter away contents of unwanted mailboxes. This may be accomplished by the matrix operations module 308 performing a dot product of each query vector and the index of the mailbox bin for which it is generated and to which it is directed. Alternatively or additionally, one or more of the query vectors may be in the form of a matrix.

At operation 710, content of a target mailbox stored in each of the plurality of mailbox bins is sent to an external computing device. For instance, the server 104 sends a target mailbox stored in each of the plurality of mailbox bins, including electronic communications 112 to computing device 118 while maintaining privacy of associated metadata. In some implementations, sending of electronic communications 112 is performed at predefined intervals of time.

As illustrated, operations 702-710 may be repeated. For example, the server 104 may be set to repeat method 700 on predetermined intervals. The server 104 may solicit electronic communications from users at repeated operation 702 and solicit a query and query matrix from a user in repeated operations 706 and 708. In some implementations, computing devices 102-1, 102-2, or 102-3 may send dummy messages including a meaningless encrypted electronic communication or a random label 114 in response to being solicited for an electronic communication when computing devices 102-1, 102-2, or 102-3 do not have a genuine electronic message to send.

Figure 8:
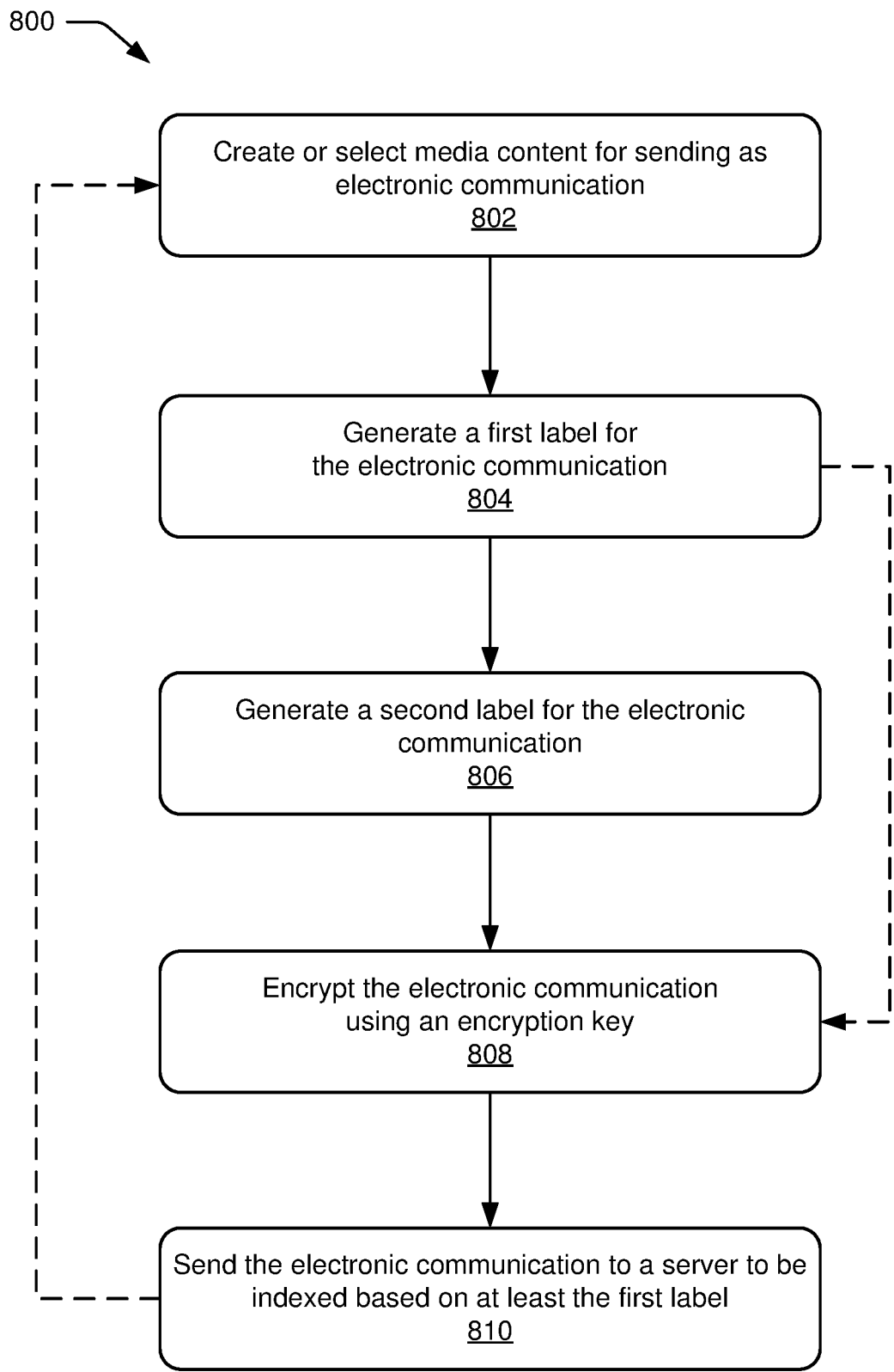
FIG. 8 is a flow diagram that describes operations in a method in accordance with one or more implementations.

FIG. 8 depicts method 800 in an example implementation in which a computing device 102-1, 102-2, or 102-3 sends an electronic communication to the server 104 for use in multi-retrieval of electronic communications 112 while maintaining privacy of associated metadata. At operation 802, media content is created or selected for sending as electronic communication. For example, a user interacts with I/O Interfaces 208 to create or select media content for sending as one of electronic communications 112. Electronic communications 112 may include, for example, one or more of text messages, electronic mail, documents, spreadsheets, presentations, images, etc. In some implementations, a user generates at least a part of the electronic communication.

At operation 804, a first label is generated for the electronic communication. For example, a first label 114 for the electronic communication is generated by the label generation module 216. The label generation module 216 may use a pseudorandom operation on a key or secret shared between computing device 102-1, 102-2, or 102-3 and computing device 118.

At operation 806, a second label for the electronic communication is generated. For example, a second label 114 is generated for the electronic communication device by the label generation module 216 to facilitate the server 104 storing the electronic communication in two different mailbox bins according to the two labels 114. In at least some implementations, operation 806 is optional, omission of which would leave the electronic communication with only one label 114 and would result in the electronic message being stored in only one mailbox bin of the server 104.

At operation 808, the electronic communication is encrypted using an encryption key. The electronic communication is encrypted, for example, by the encryption/decryption module 216 of computing device 102-1, 102-2, or 102-3 using an encryption scheme. The encryption scheme may use the key or secret shared between computing device 102-1, 102-2, or 102-3 and computing device 118.

At operation 810, the electronic communication is sent to the server to be indexed based on at least the first label. For example, computing device 102-1, 102-2, or 102-3 may send the electronic communication to the server 104 to be indexed based on at least the first label 114. In implementations where two or more labels are generated for the electronic communication, e.g., at operation 806, the electronic communication may be delivered to the server to be indexed based on each of the two or more labels. Alternatively or additionally, the electronic communication may be duplicated by a sending computing device, e.g., electronic device 102, and sent as two or more electronic communications, each having a unique label. As illustrated, method 800 may be repeated. In some implementations, method 800 may be repeated multiple times as computing device 102 sends multiple electronic communications during a sending phase.

Figure 9:
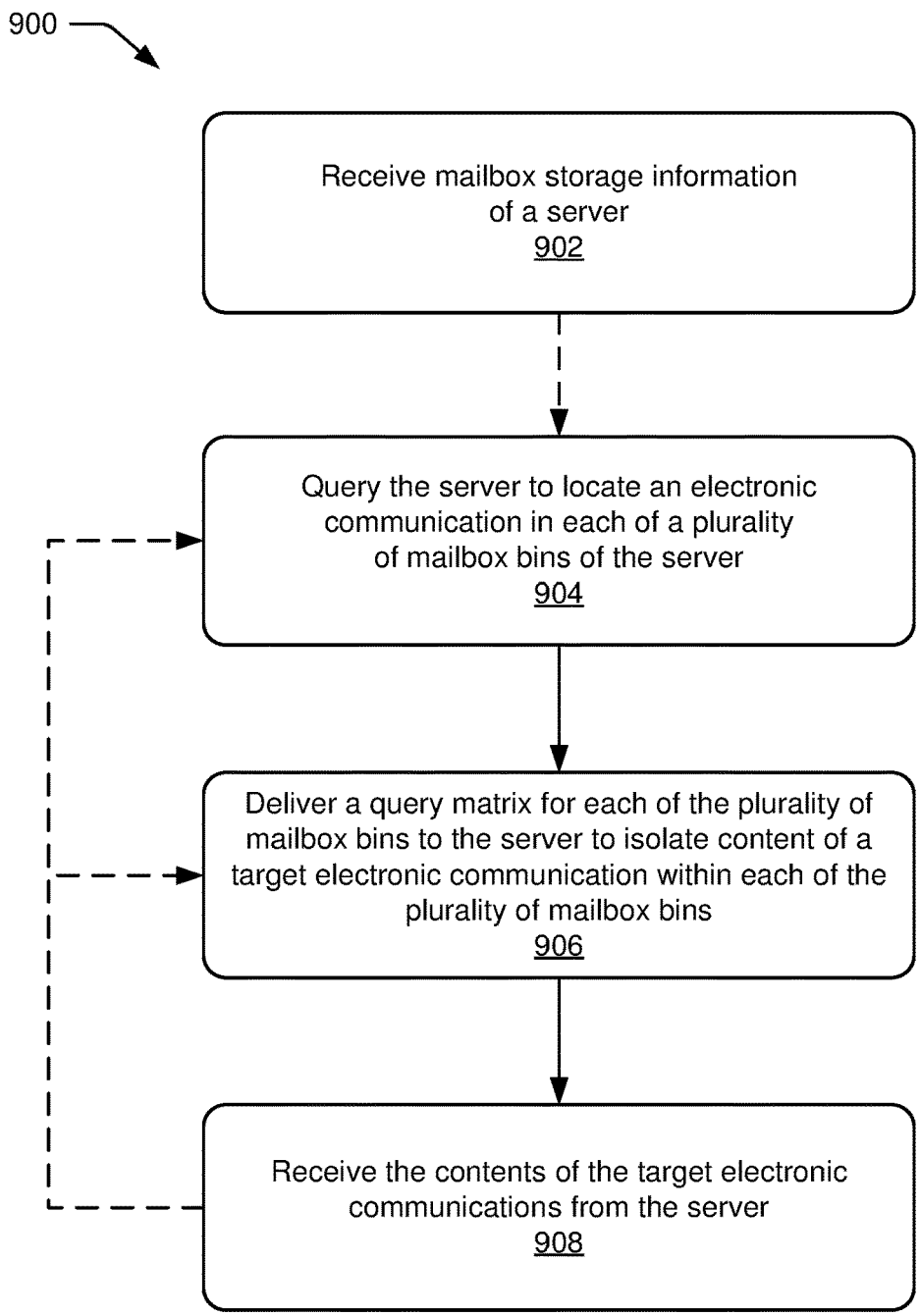
FIG. 9 is a flow diagram that describes operations in a method in accordance with one or more implementations.

FIG. 9 depicts method 900 in an example implementation in which a computing device 118 locates and receives electronic communications 112 within a plurality of mailbox bins while protecting metadata associated with the delivery of the electronic communication 112 from a sending device 102-1, 102-2, or 102-3 to computing device 118.

At operation 902, mailbox storage information of a server is received. The computing device 118, for example, receives mailbox storage information of the server 104. Mailbox storage information may include label ranges for each of multiple mailbox bins of the server 104, mailbox bin indexing structures of the multiple mailbox bins, and/or a quantity of mailboxes stored within each of the mailbox bins.

At operation 904, the server is queried to locate an electronic communication in each of a plurality of mailbox bins of the server. For example, computing device 118 queries the server 104, using methods described herein. The querying, for instance, includes probing to locate an electronic communication in each of a plurality of the multiple mailbox bins.

At operation 906, a query matrix is delivered for each of the plurality of mailbox bins to the server to isolate content of a target electronic communication within each of the plurality of mailbox bins. For example, computing device 118 delivers a query matrix (or query vector) to the server 104 for each of a plurality of the multiple mailbox bins configured to secretly isolate content of a plurality of target electronic communications within each of the plurality of mailbox bins, according to methods described herein.

At operation 908, the contents of the target electronic communications are received from the server. The computing device 118, for instance, receives the contents of the target electronic communications 112 from the server 104. In some implementations, computing device 118 is only able to receive one target electronic communication in each mailbox bin during a receiving phase. This may result in computing device 118 being unable to receive each target electronic communication in a single receive phase. Therefore, in some implementations, electronic communications remain for a predetermined quantity of send and receive phases so that computing device 118 may retrieve an electronic communication that it was unable to receive during a previous receive phase. Alternatively, or additionally, steps 804 through 808 may be repeated within a single receive phase. However, to protect an identity, or prevent a narrowing of a group of possible identities of a target electronic communication, steps 804 through 808 may be repeated for each mailbox bin of the server 104 and may be repeated a predetermined quantity of times during every receive phase.

Example System and Device

Figure 10:
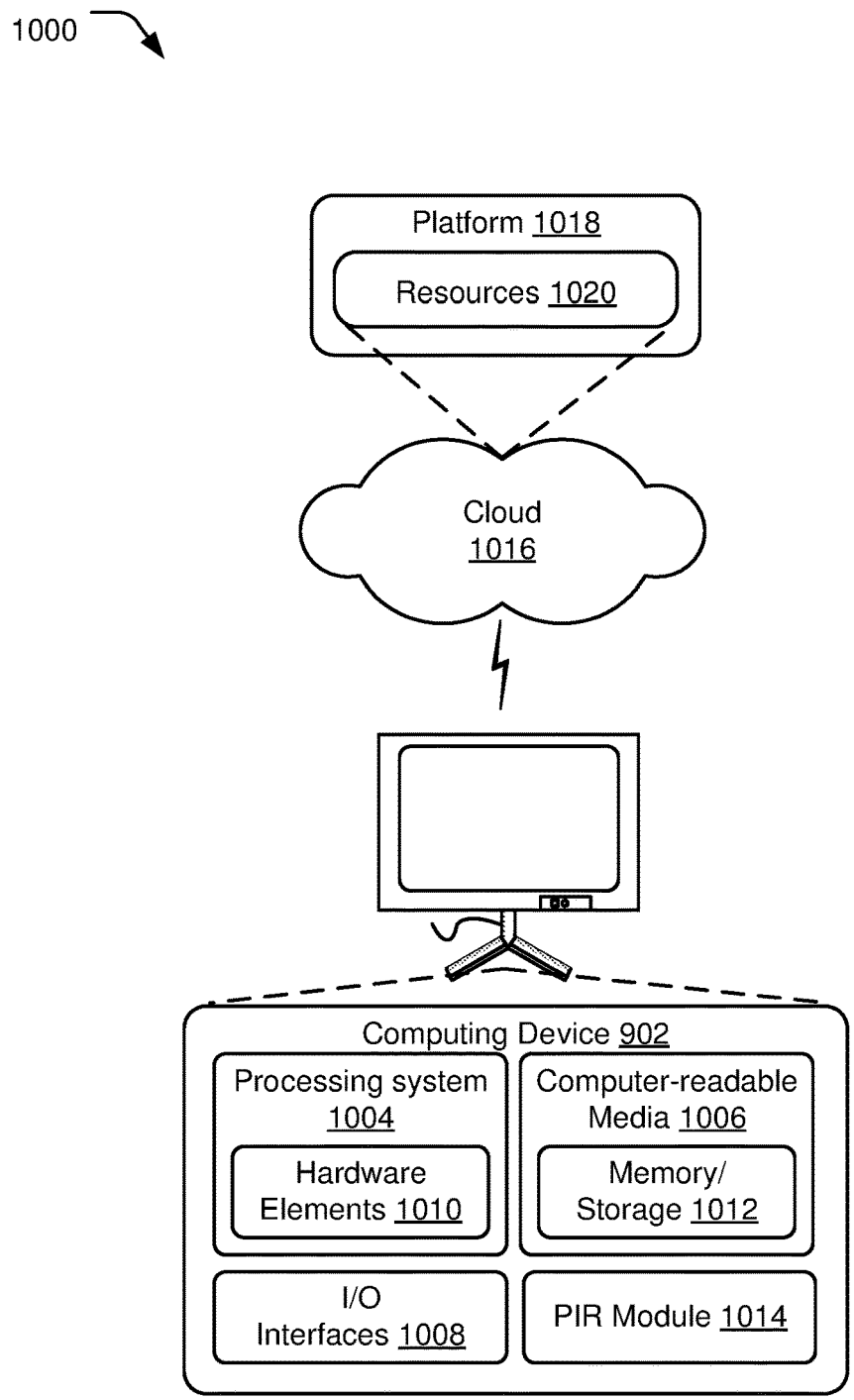
FIG. 10 illustrates an example system including various components of an example device that can be implemented as any type of computing device as described and/or utilize with reference to FIGS. 1-9 to implement aspects of the techniques described herein.

FIG. 10 illustrates an example system generally at 1000 that includes an example computing device 1002, which is representative of one or more computing systems and/or devices that may implement the various techniques described herein. This is illustrated through inclusion of private information retrieval ("PIR") module 1014, which may be configured to implement one or more operations performed by computing device 102-1, 102-2, or 102-3, the server 104 or computing device 118 relating to computing device 102-1, 102-2, or 102-3 securely sending electronic communication 112 to the second computing device 118 without the server 104 being aware of the contents of the electronic communication 112 or being aware of a communication relationship of the first computing device 102 and the second computing device 118 as discussed herein. For example, PIR module 1014 may be representative of encryption/decryption module 214, query module 216, mailboxes index 108, or matrix operations module 308.

Computing device 1002 may be, for example, a server of a service provider, a device associated with a client (e.g., a client device), an on-chip system, and/or any other suitable computing device or computing system.

Computing device 1002 as illustrated includes a processing system 1004, one or more computer-readable media 1006, and one or more I/O interfaces 908 that are communicatively coupled, one to another. Although not shown, computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010, which may be configured as processors, functional blocks, and so forth. This may include implementation in hardware as an application-specific integrated circuit or other logic device formed using one or more semiconductors. Hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1006 is illustrated as including memory/storage 1012. Memory/storage 1012 represents memory/storage capacity associated with one or more computer-readable media. Memory/storage 1012 may include volatile media (such as random access memory (RAM)) and/or nonvolatile media (such as read only memory (ROM), Flash memory, optical disks, magnetic disks, and so forth). Memory/storage 1012 may include fixed media (e.g., RAM, ROM, a fixed hard drive, and so on) as well as removable media (e.g., Flash memory, a removable hard drive, an optical disc, and so forth). Computer-readable media 1006 may be configured in a variety of other ways as further described below.

Input/output interfaces 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The entities described herein (e.g., PIR module 1014) generally represent software, firmware, hardware, or a combination thereof. The features of the techniques described herein are platform-independent, meaning that the techniques may be implemented on a variety of commercial computing platforms having a variety of processors.

An implementation of the described entities and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. Computing device 1002 may be configured to implement particular instructions and/or functions corresponding to the software and/or hardware modules. Accordingly, implementation of a module that is executable by computing device 1002 as software may be achieved at least partially in hardware, e.g., through use of computer-readable storage media and/or hardware elements 1010 of processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1016 via a platform 1018 as described below.

Cloud 1016 includes and/or is representative of platform 1018 for resources 1020. Platform 818 abstracts underlying functionality of hardware (e.g., servers) and software resources of cloud 1016. Resources 1020 may include applications and/or data that can be utilized while computer processing is executed on servers that are remote from computing device 1002. Resources 1020 can also include services provided over the Internet and/or through a subscriber network, such as a cellular or Wi-Fi network.

Platform 1018 may abstract resources and functions to connect computing device 1002 with other computing devices. Platform 1018 may also serve to abstract scaling of resources to provide a corresponding level of scale to encountered demand for resources 1020 that are implemented via platform 1018. Accordingly, in an interconnected device implementation, implementation of functionality described herein may be distributed throughout system 1000. For example, the functionality may be implemented in part on computing device 1002 as well as via platform 816 that abstracts the functionality of cloud 1014.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for sending secure electronic communications, the system comprising: at least one processor; and at least one computer-readable storage medium storing instructions that are executable by the at least one processor to perform operations including: storing multiple target electronic communications in multiple target mailboxes, each of the multiple target electronic communications having two labels and being stored into two distinct target mailboxes having corresponding labels; sorting the multiple target mailboxes, based on labels, into multiple mailbox bins and indexing locations of mailboxes stored therein; receiving a query including one or more probes to locate indexed locations of at least one target mailbox in each of a plurality of the multiple mailbox bins, and a query vector of encrypted entries to isolate content of at least one of the target mailboxes in each of the plurality of the mailbox bins; and sending content of a target mailbox stored in each of the plurality of mailbox bins to an external computing device.

Alternatively or in addition to any of the above described systems, any one or combination of: wherein at least one of the plurality of mailbox bins is indexed into a hierarchical data structures and wherein levels of the hierarchical data structure independently queryable; wherein the operations further include, prior to said sending, delivering labels of a plurality of levels of the hierarchal data structure of one or more of the multiple mailbox bins to the external computing device; wherein at least one of the plurality of mailbox bins is indexed according to alphanumerical ordering; wherein the query comprises a series probes, each of which is determined based in part on a result of a previous probe, to locate the at least one target mailbox in each of the plurality of the multiple mailbox bins; wherein the system comprises one or more untrusted servers or untrusted internet service providers; wherein a quantity of mailbox bins is equal to a quantity of electronic communications that the external computing device is permitted to receive from the system in a single receiving phase; wherein the operations further include sending to the external computing device information about one or more of the multiple mailbox bins including one or more of label ranges, quantity of messages, and storage structure of the mailbox bin.

A method for secure electronic communication, the method comprising: querying a server, the query configured to find an indexed location of a target mailbox in each of a plurality of multiple mailbox bins; delivering to the server a query vector generated for each of the plurality of mailbox bins, the query vector configured with entries to isolate content of the target mailbox a mailbox bin; receiving content of the target mailbox from each of the plurality of the mailbox bins.

Alternatively or in addition to any of the above described systems, any one or combination of: the method further comprising determining a mailbox content retrieval strategy based on label ranges of the plurality of mailbox bins; further comprising receiving mailbox storage information from the server including one or more of label ranges, quantity of messages, and storage structure of the plurality of mailbox bins; the query further comprising a random query directed to a mailbox bin not containing a target mailbox, the random query to probe the mailbox bin to imitate attempting to find an indexed location of a target mailbox; further comprising sending a query vector to the mailbox bin wherein the query vector is configured with entries encrypted to 0 at all entries; further comprising, after a predetermined interval: dummy querying the server, the dummy query imitating querying without indexed locations of target mailboxes to find; and delivering to the server, a dummy query vector of ciphertext entries encrypted to 0 at all entries; wherein querying, delivering, and receiving are repeated to retrieve a second target mailbox from a mailbox bin from which a first target mailbox was already retrieved; wherein the querying, delivering, and receiving are repeated in each of the plurality of mailbox bins to protect metadata relating to a label range of the second target mailbox; wherein querying further comprises performing joint tree reversal to find an indexed location of at least one target mailbox in at least one of the multiple mailbox bins.

A method for sending multiple secure electronic communications, the method comprising: storing multiple target electronic communications in multiple target mailboxes, each of the multiple target electronic communications having two labels and being stored into two distinct target mailboxes having corresponding labels; sorting the multiple target mailboxes, based on labels, into multiple mailbox bins and indexing locations of mailboxes stored therein; receiving a query including one or more probes for a plurality of the multiple mailbox bins to locate a target mailbox of a plurality of mailbox bins based on the labels of the target mailboxes and a set of query vectors, each of the set of query vectors directed to one of the plurality of mailbox bins, to isolate a target mailbox in the one of the plurality of mailbox bins; and sending contents of the target mailboxes stored in each of the plurality of mailbox bins to an external computing device.

Alternatively or in addition to any of the above described methods, any one or combination of: wherein the locations of mailboxes stored in the multiple mailbox bins are indexed into binary search trees and wherein, prior to receiving the one or more probes of the query, labels of a plurality of levels of the binary search trees are sent to the external computing device; further comprising encoding one or more bin contents via a sub-cube batch code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

CONCLUSION

Although the implementations have been described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method for secure electronic communication to obscure a single target mailbox as a retrieval target, the method comprising:
   querying a server, the query configured to find an indexed location of a target mailbox in each of a plurality of multiple mailbox bins, wherein the querying delivers to the server a query vector generated for each of the plurality of mailbox bins, the query vector configured with entries to isolate content of the target mailbox in each of a plurality of multiple mailbox bins; and
   receiving content of the target mailbox from each of the plurality of the mailbox bins to obscure the single target mailbox as the retrieval target.

2. The method as in claim 1, further comprising determining a mailbox content retrieval strategy based on label ranges of the plurality of mailbox bins.

3. The method as in claim 1, further comprising receiving mailbox storage information from the server including one or more of label ranges, quantity of messages, and storage structure of the plurality of mailbox bins.

4. The method as in claim 1, wherein the query further comprising a random query directed to a mailbox bin not containing a target mailbox, the random query to probe the mailbox bin to imitate attempting to find an indexed location of a target mailbox.

5. The method as in claim 4, further comprising sending a query vector to the mailbox bin wherein the query vector is configured with entries encrypted to 0 at all entries.

6. The method as in claim 1, further comprising, after a predetermined interval:
   dummy querying the server, the dummy query imitating querying without indexed locations of target mailboxes to find; and
   delivering to the server, a dummy query vector of ciphertext entries encrypted to 0 at all entries.

7. The method as in claim 1, wherein the querying and the receiving are repeated to retrieve a second target mailbox from a mailbox bin from which a first target mailbox was already retrieved.

8. The method as in claim 7, wherein the querying and the receiving are repeated in each of the plurality of mailbox bins to protect metadata relating to a label range of the second target mailbox.

9. The method as in claim 1, wherein querying further comprises performing joint tree reversal to find an indexed location of at least one target mailbox in at least one of the multiple mailbox bins.

10. The method as in claim 1, further comprising:
    parsing the content returned from the plurality of mailbox bins;
    isolating target content from the single target mailbox of the parsed content returned from the plurality of mailbox bins; and
    extracting the isolated target content from the single target mailbox.

11. A system for secure electronic communication to obscure a single target mailbox as a retrieval target, the system comprising:
    at least one processor; and
    a memory, operatively connected with the at least one processor, storing computer executable instructions that, when executed by the at least one processor, causes the at least one processor to execute a method that comprises:
       querying a server, the query configured to find an indexed location of a target mailbox in each of a plurality of multiple mailbox bins, wherein the querying delivers to the server a query vector generated for each of the plurality of mailbox bins, the query vector configured with entries to isolate content of the target mailbox in each of a plurality of multiple mailbox bins; and
       receiving content of the target mailbox from each of the plurality of the mailbox bins to obscure the single target mailbox as the retrieval target.

12. The system as in claim 11, wherein the query further comprising a random query directed to a mailbox bin not containing a target mailbox, the random query to probe the mailbox bin to imitate attempting to find an indexed location of a target mailbox.

13. The system as in claim 11, wherein the method, executed by the at least one processor, further comprises, after a predetermined interval:
dummy querying the server, the dummy query imitating querying without indexed locations of target mailboxes to find; and
delivering to the server, a dummy query vector of ciphertext entries encrypted to 0 at all entries.

14. The system as in claim 11, wherein the querying and the receiving are repeated to retrieve a second target mailbox from a mailbox bin from which a first target mailbox was already retrieved.

15. The system as in claim 11, wherein the querying and the receiving are repeated in each of the plurality of mailbox bins to protect metadata relating to a label range of the second target mailbox.

16. The system as in claim 11, wherein the method, executed by the at least one processor, further comprises:
parsing the content returned from the plurality of mailbox bins;
isolating target content from the single target mailbox of the parsed content returned from the plurality of mailbox bins; and
extracting the isolated target content from the single target mailbox.

17. A computer-readable medium storing computer executable instructions that, when executed by at least one processor, causes the at least one processor to execute a method comprising:
querying a server, the query configured to find an indexed location of a target mailbox in each of a plurality of multiple mailbox bins, wherein the querying delivers to the server a query vector generated for each of the plurality of mailbox bins, the query vector configured with entries to isolate content of the target mailbox in each of a plurality of multiple mailbox bins; and
receiving content of the target mailbox from each of the plurality of the mailbox bins to obscure the single target mailbox as the retrieval target.

18. The computer-readable medium as in claim 17, wherein the method further comprising:
parsing the content returned from the plurality of mailbox bins;
isolating target content from the single target mailbox of the parsed content returned from the plurality of mailbox bins; and
extracting the isolated target content from the single target mailbox.

19. The computer-readable medium as in claim 17, wherein the query further comprises a label range for identifying the indexed location of a target mailbox in each of a plurality of multiple mailbox bins, and wherein the label range is specific to multiple mailboxes.

20. The computer-readable medium as in claim 17, wherein the method further comprising:
receiving, in response to the query, mailbox storage information from the server including one or more of label ranges, quantity of messages, and storage structure of the plurality of mailbox bins; and
utilizing the label ranges of the mailbox storage information to sort the content of the target mailbox from each of the plurality of the mailbox bins.

\* \* \* \* \*